(12) United States Patent
Ko et al.

(10) Patent No.: US 10,527,883 B2
(45) Date of Patent: Jan. 7, 2020

(54) REFLECTIVE POLARIZER AND BACKLIGHT UNIT INCLUDING SAME

(71) Applicant: TORAY CHEMICAL KOREA INC., Gyeongsangbuk-do (KR)

(72) Inventors: Seung Jin Ko, Gyeongsangbuk-do (KR); Duk Jae Cho, Gyeongsangbuk-do (KR); Hwang Kyu Lee, Gyeongsangbuk-do (KR)

(73) Assignee: Toray Chemical Korea Inc., Gyeongsangbuk-do (KR)

( * ) Notice: Subject to any disclaimer, the term of this patent is extended or adjusted under 35 U.S.C. 154(b) by 73 days.

(21) Appl. No.: 15/739,547

(22) PCT Filed: Jun. 23, 2016

(86) PCT No.: PCT/KR2016/006677
§ 371 (c)(1),
(2) Date: Dec. 22, 2017

(87) PCT Pub. No.: WO2016/208987
PCT Pub. Date: Dec. 29, 2016

(65) Prior Publication Data
US 2018/0172887 A1 Jun. 21, 2018

(30) Foreign Application Priority Data

Jun. 26, 2015 (KR) .................. 10-2015-0090918

(51) Int. Cl.
*G02F 1/1335* (2006.01)
*G02B 5/30* (2006.01)

(52) U.S. Cl.
CPC ......... *G02F 1/133536* (2013.01); *G02B 5/30* (2013.01); *G02F 1/133528* (2013.01)

(58) Field of Classification Search
CPC ...... G02B 5/30; G02B 5/3025; G02B 6/0056; G02B 5/3033; G02B 6/02109; G02F 1/13362; G02F 1/133536; G02F 1/133528; G02F 1/133602; G02F 1/0311; G02F 1/116; G02F 1/1335; G02F 1/133533; G02F 2001/133531; G02F 2001/133521; G02F 2001/13356;
(Continued)

(56) References Cited

U.S. PATENT DOCUMENTS

2005/0270655 A1 12/2005 Weber et al.
2006/0226562 A1* 10/2006 Johnson .................. B29C 55/04
264/1.34

(Continued)

FOREIGN PATENT DOCUMENTS

| JP | 2012-236351 | 12/2012 |
| KR | 1020160081606 | 7/1916 |
| KR | 1020000029721 | 5/2000 |
| KR | 1020120092030 | 8/2012 |

(Continued)

*Primary Examiner* — Shan Liu
(74) *Attorney, Agent, or Firm* — Norton Rose Fulbright US LLP

(57) ABSTRACT

The present invention relates to a reflective polarizer and a backlight unit including same and, more particularly, to a reflective polarizer and a backlight unit including same which can display excellent and uniform brightness throughout the visible light wavelength range in the following manner. Regardless of the incident angle of incident light, a discordance in the refractive index in one particular direction is minimized, and the transmissivity of polarized light targeted within the visible light wavelength range is uniform. Thus, light transmitted through the reflective polarizer is not biased toward a particular wavelength range, and the exterior is not colorful or a particular color due to rainbow-colored light. Because the reflectivity of polarized light not targeted within the visible light wavelength range is significantly large, the light is not biased toward a particular wavelength range.

9 Claims, 11 Drawing Sheets

(58) Field of Classification Search
CPC ...... G02F 2001/133538; G02F 2001/133541;
G02F 2001/133543; G02F 2001/133545;
G02F 2001/133548; G02F 2001/13355;
G02F 2001/133562; G02F 2001/133567;
G02F 2203/16; B29D 11/00644; B32B
17/10458; B32B 2307/42; H01L 51/5293;
H01R 12/7005; H04B 10/532; G01J
5/0825; G03F 9/7065; G01R 33/3678;
C09K 19/0208
USPC .......................................... 349/96–103, 194
See application file for complete search history.

(56) References Cited

U.S. PATENT DOCUMENTS

| | | | |
|---|---|---|---|
| 2007/0264447 A1* | 11/2007 | Oya | B32B 7/02 |
| | | | 428/1.31 |
| 2012/0161345 A1* | 6/2012 | Greener | B29D 11/00644 |
| | | | 264/1.34 |
| 2012/0249935 A1* | 10/2012 | Oya | B32B 27/08 |
| | | | 349/96 |
| 2017/0017117 A1* | 1/2017 | Shimizu | G02B 5/3033 |
| 2017/0205549 A1* | 7/2017 | Shimizu | B32B 27/36 |
| 2017/0343715 A1* | 11/2017 | Fang | G02F 1/13363 |

FOREIGN PATENT DOCUMENTS

| | | |
|---|---|---|
| KR | 1020140021257 | 2/2014 |
| KR | 101489400 | 2/2015 |
| KR | 1020150079168 | 7/2015 |
| KR | 1020150079170 | 7/2015 |

\* cited by examiner

REFLECTIVE POLARIZER AND BACKLIGHT UNIT INCLUDING SAME

CROSS-REFERENCE TO RELATED APPLLICATIONS

This application is a national phase application under 35 U.S.C. § 371 of International Patent Application No. PCT/KR2016/006677, filed Jun. 23, 2016, which claims priority to Korean Patent Application No. 10-2015-0090918, filed Jun. 26, 2015. The contents of the referenced application are incorporated into the present application by reference.

FIELD OF THE DISCLOSURE

The present invention relates to a reflective polarizer and a backlight unit including the same, and more particularly, to a reflective polarizer which can exhibit excellent and uniform brightness throughout a visible light wavelength range in the following manner, and a backlight unit including the same. Regardless of normal line incidence and non-normal line incidence of light, a mismatch in a refractive index in one specific axial direction is minimized and transmittance of targeted polarized light within the visible light wavelength range is uniform. Thus, light transmitted through the reflective polarizer is not biased toward a specific wavelength range, and an exterior is not colorful like rainbow-color or does not show a specific color. Because reflectivity of untargeted polarized light within the visible light wavelength range is significantly large, the light is not biased toward a specific wavelength range.

DESCRIPTION OF RELATED ART

Flat panel display technique is being mainly used for liquid-crystal displays (LCDs), projection displays, and plasma displays (PDPs), which have already secured a market in the TV field. With improvement of related techniques, field emission displays (FEDs), electroluminescent displays (ELDs), and the like are expected to occupy fields according to characteristics thereof. LCDs are currently increasingly used in laptop computers, personal computer monitors, liquid crystal TVs, automobiles, aircrafts, and the like, account for 85% of the flat panel display market, and are becoming more popular since the global demand for LCDs has surged.

In a conventional LCD, a liquid crystal and electrode matrix is disposed between a pair of light absorbing optical films. In the LCD, a liquid crystal portion has an optical state which changes according to movement of the liquid crystal portion due to an electric field generated by a voltage being applied to two electrodes. An image is displayed on pixels including information using polarized light in a specific direction through such processing. For this reason, the LCD includes a front optical film and a rear optical film which induce polarization.

The optical films used in the LCD do not necessarily have a high utilization efficiency of light emitted from a backlight unit. This is because at least 50% of the light emitted from the backlight unit is absorbed by the rear optical film (absorption type polarizing film). Therefore, a reflective polarizer may be provided between an optical cavity and a liquid-crystal assembly to increase utilization efficiency of light of the backlight unit in the LCD.

The reflective polarizer prevents degradation of optical performance due to light loss and is slimmed according to a thickness of a slimmed display panel. Research on the reflective polarizer is continuing in a direction of simplifying a manufacturing process, minimizing the occurrence of defects in the manufacturing process, and improving productivity and economic feasibility.

Meanwhile, FIG. 1 is a graph showing an optical principle of a conventional reflective polarizer. Specifically, P-polarized light among light from an optical cavity toward a liquid-crystal assembly is transmitted to the liquid-crystal assembly through the reflective polarizer. S-polarized light is reflected by the reflective polarizer toward the optical cavity, is then reflected therefrom in a state in which a polarization direction of the light at a diffusive reflective surface of the optical cavity is randomized, and is transmitted to the reflective polarizer. Finally, the S -polarized light is converted into P-polarized light that can be transmitted through a polarizer of the liquid-crystal assembly, pass through the reflective polarizer, and then be transmitted to the liquid-crystal assembly.

The selective reflection of the S-polarized light and the transmission of the P-polarized light relative to light incident on the reflective polarizer are performed on an interface of each of optical layers due to setting of an optical thickness setting of each of the optical layers according to elongation process of the optical layer, a change of a refractive index of the optical layer, and a difference in a refractive index between an optical layer having an anisotropic refractive index and an optical layer having an isotropic refractive index according to the change of the refractive index.

That is, the light incident on the reflective polarizer repeats the reflection of the S-polarized light and the transmission of the P-polarized light while passing through each of the optical layers, and finally, only the P-polarized light of the incident polarized light is transmitted to the liquid-crystal assembly. On the other hand, as described above, the reflected S-polarized light is reflected in the state in which the polarization state at the diffusive reflective surface of the optical cavity is randomized and is then transmitted to the reflective polarizer. As a result, power waste and loss of light generated by a light source may be reduced.

Meanwhile, as described above, elongation processing of the optical layer induces a refractive index difference between adjacent optical layers. The elongation processing is usually performed in any one of X, Y, and Z axes in space, and the refractive indexes of the non-elongated other two axes are lightly changed. However, since the refractive indexes of the non-elongated axes are not necessarily changed, when a difference between the refractive indexes of the two axes is 0.06 or less, such a state is commonly regarded as a match, and when the difference is more than 0.06, such a state is regarded as a mismatch.

The mismatch according to the difference between the refractive indexes of the two non-elongated axes causes a problem in that transmittance of targeted polarized light to be transmitted through the reflective polarizer may be reduced or transmittance of untargeted polarized light may be increased. Specifically, the transmittance of the targeted polarized light may be reduced throughout the entire visible light wavelength range. However, in conventionally researched and developed reflective polarizers, transmittance of polarized light is reduced in a specific wavelength range of the visible light wavelength range, the reduction of the transmittance in the specific wavelength range makes the transmittance of polarized light in another wavelength range in which transmittance is not reduced relatively high, and thus there is a problem in that an exterior of the reflective polarizer is realized with a color in a wavelength range of a relatively high transmittance. For example, due to significant reduction of transmittance in a wavelength range of 450 to 500 nm corresponding to blue light, transmission of yellow light (a wavelength range of 570 to 590 nm) or red light (a wavelength range of 610 to 700 nm), of which transmittance is not reduced, is relatively increased so that the exterior of the reflective polarizer appears yellow or red.

Particularly, as the above-described problems significantly occur in the light incident on the reflective polarizer in a non-normal line, it is very difficult to adjust a color of a display due to such a problem, and a color feeling realized through the display becomes very poor.

Further, due to the reduction of the transmittance of the light in the specific wavelength range, targeted polarized light reaching the liquid-crystal assembly may be reduced so that problems such as brightness decrease and the like may occur.

Specifically, in a reflective polarizer according to Korean Unexamined Patent Application Publication No. 2000-0029721, an embodiment in which a problem associated with reduction of transmittance of polarized light in a specific wavelength range as described above is addressed is disclosed. However, in the embodiment, transmittance of blue and/or yellow light is relatively increased by significantly reducing transmittance of targeted polarized light in a wavelength range of 600 to 700 nm to prevent an exterior of a reflective polarizer from appearing red. Such a reflective polarizer is prevented from appearing the exterior red but the exterior of the reflective polarizer may still appear blue or yellow, and an increase of transmittance of light occurred in a wavelength range of a specific color may still not address difficulty in adjusting a color of a display.

Specifically, in a case of a conventional multilayer stacked reflective polarizer, since transmittance/reflectivity trends are differentiated in a visible light wavelength range according to normal incident light and non-normal incident light, a color of an exterior is different from a color to be actually realized when the display is viewed from side.

More particularly, FIG. 1 is a graph showing transmittance spectra of polarized light (P wave) with respect to an incident angle of 60° of a reflective polarizer according to the above embodiment, and it can be seen that transmittance of light in a wavelength range of 610 to 700 nm corresponding to red in a wavelength range of 400 to 700 nm is reduced to at least 40% thereof so that transmission of red polarized light is relatively reduced, and transmission of light in the other wavelength ranges is increased so that the reflective polarizer is prevented from appearing red. However, the exterior of the reflective polarizer having the transmittance spectra for each wavelength as shown in FIG. 1 may appear to be blue or yellow in color, so that there is still difficulty in controlling the color of the display. Also, as can be seen from FIG. 1, it can be seen that the transmittance of the light in the wavelength range of 400 to 600 nm except for about 450 nm is significantly reduced to be less than 80% thereof, and the decrease of the transmittance may cause a problem that an intensity of P-polarized light reaching an LCD is reduced and brightness of the display is significantly reduced.

Further, in S-polarized light (which corresponds to c of FIG. 1, and c represents transmittance of polarized light parallel to extinction axis when light is incident in a normal line) which should be reflected without reaching the LCD, some wavelength ranges of wavelength ranges of visible light have excellent reflectivity but the other wavelength ranges have significantly reduced reflectivity, reflectivity for each wavelength band is not uniform so that brightness in a specific wavelength band may be significantly reduced and a color modulation phenomenon may be more difficult to control.

Accordingly, it is urgent to develop a reflective polarizer which can easily adjust a color and can exhibit excellent and uniform brightness in a visible light wavelength range in the following manner. Regardless of light incident on a reflective polarizer in a normal line and a non-normal line, polarized light transmitted through the reflective polarizer is uniformly transmitted without being biased toward a specific wavelength range, and an exterior does not show a specific color or rainbow-color.

SUMMARY OF THE INVENTION

The present invention is directed to providing a reflective polarizer which can exhibit excellent and uniform brightness throughout a visible light wavelength range in the following manner, and a backlight unit including the same. Regardless of normal line incidence and non-normal line incidence of light, a mismatch in a refractive index in one specific axial direction is minimized and transmittance of targeted polarized light within the visible light wavelength range is uniform. Thus, light transmitted through the reflective polarizer is not biased toward a specific wavelength range, and an exterior is not colorful like rainbow-color or does not show a specific color. Because reflectivity of untargeted polarized light within the visible light wavelength range is significantly large, the light is not biased toward a specific wavelength range.

One aspect of the present invention provides a reflective polarizer configured to transmit first polarized light parallel to a transmission axis and reflect second polarized light parallel to extinction axis, wherein reflectivity of the second polarized light in a wavelength range of 380 to 780 nm according to a light ray having an incident angle of 45° is 85% or more, a reflectivity change ratio of the second polarized light in a wavelength range of 450 to 780 nm according to a light ray having an incident angle of 45° according to Equation 1 below is 0.05%/nm or less, and preferably is 0.03%/nm, $$\text{reflectivity change ratio} = \left| \frac{R_2(\%) - R_1(\%)}{\lambda_2(nm) - \lambda_1(nm)} \right| \quad \text{[Equation 1]}$$

Here, $\lambda_1$ is 450 nm, $R_1$ denotes reflectivity of the second polarized light at $\lambda_1$, $\lambda_2$ is 780 nm, and $R_2$ denotes reflectivity of the second polarized light at $\lambda_2$.

According to an embodiment of the present invention, the second polarized light according to the light ray having an incident angle of 45° may have a visible light reflection uniformity of 5% or less in a wavelength range of 480 to 580 nm, and a visible light reflection uniformity of 6% or less in a wavelength range of 580 to 780 nm.

The second polarized light according to the light ray having an incident angle of 45° may have reflectivity of 94 to 96% at a wavelength of 480 nm, reflectivity of 92 to 94% at a wavelength of 580 nm, reflectivity of 88 to 91% at a wavelength of 680 nm, and reflectivity of 85 to 88% at a wavelength of 780 nm.

The first polarized light according to the light ray having an incident angle of 45° may have transmittance of 72% or more in a wavelength range of 450 to 780 nm.

Reflectivity of the second polarized light at the same wavelength as the first polarized light having a lowest transmittance among transmittances of the first polarized light according to the wavelength range may be 95% or more.

The first polarized light according to the light ray having an incident angle of 45° may have a visible light transmission uniformity of 8% or less in a wavelength range of 480 to 580 nm, and a visible light transmission uniformity of 5% or less in a wavelength range of 580 to 780 nm.

The reflective polarizer may include a base material and a plurality of dispersed bodies dispersed in the base material.

The plurality of dispersed bodies may be randomly dispersed inside the base material.

At least two of the plurality of dispersed bodies may have different cross-section areas.

In the reflective polarizer, the plurality of dispersed bodies may be dispersed inside the base material, and the plurality of dispersed bodies may be randomly dispersed for each thickness without forming groups or layers inside the base material.

Another aspect of the present invention provides a reflective polarizer configured to transmit first polarized light parallel to a transmission axis and reflect second polarized light parallel to an extinction axis, wherein a difference between maximum transmittance of and minimum transmittance of the first polarized light in a wavelength range of 450 to 780 nm is 20% or less, and preferably is 15% or less.

Still another aspect of the present invention provides a reflective polarizer configured to transmit first polarized light parallel to a transmission axis and reflect second polarized light parallel to an extinction axis, wherein a difference between first transmittance (%) of the first polarized light according to a light ray having an incident angle of 90° at a wavelength of 580 nm and second transmittance (%) of the first polarized light according to the light ray having an incident angle of 45° at a wavelength of 580 nm is 8% or less.

A difference between third transmittance (%) of the first polarized light according to a light ray having an incident angle of 90° at a wavelength of 450 nm and fourth transmittance (%) of the first polarized light according to the light ray having an incident angle of 45° at a wavelength of 450 nm may be 5% or less.

A difference between fifth transmittance (%) of the first polarized light according to a light ray having an incident angle of 90° at a wavelength of 780 nm and sixth transmittance (%) of the first polarized light according to the light ray having an incident angle of 45° at a wavelength of 780 nm may be 5% or less.

Yet another aspect of the present invention provides a backlight unit including the reflective polarizer according to the present invention.

Yet another aspect of the present invention provides a liquid-crystal display including the backlight unit according to the present invention.

Hereinafter, terms used in the present invention will be described.

The term "finally" used in describing polarization in the present invention is not limited only to physical properties measured only by intrinsic properties of a reflective polarizer itself, for example, transmittance of first polarized light through one light incidence, and includes transmittance of second polarized light that is reflected after being reflected is again incident on the reflective polarizer, is modulated to the first polarized light, and is transmitted through the reflective polarizer.

A display can be implemented using a reflective polarizer of the present invention which can exhibit excellent and uniform brightness throughout a visible light wavelength range in the following manner. Regardless of normal line incidence and non-normal line incidence of light, a mismatch in a refractive index in one specific axial direction is minimized and transmittance of targeted polarized light within the visible light wavelength range is uniform. Thus, light transmitted through the reflective polarizer is not biased toward a specific wavelength range, and an exterior is not colorful or does not show a specific color like rainbow-color. Because reflectivity of untargeted polarized light within the visible light wavelength range is significantly large, the light is not biased toward a specific wavelength range.

DETAILED DESCRIPTION OF THE INVENTION

Figure 1:
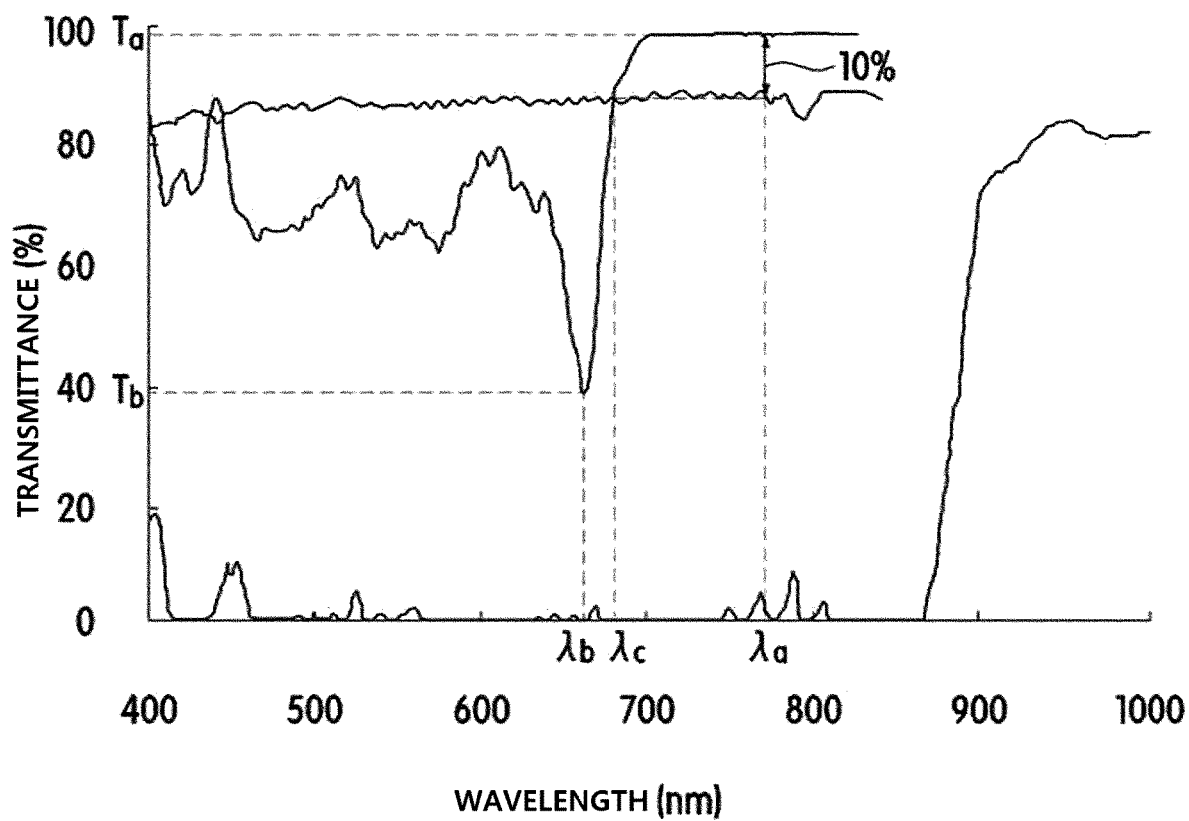
FIG. 1 is a graph showing transmittance for each wavelength of P-polarized light which is incident on a conventional reflective polarizer with an angle of 60° in a non-normal line and transmitted to the conventional reflective polarizer.

Hereinafter, the present invention will be described in detail.

As described above, in conventionally researched and developed reflective polarizers, transmittance of targeted polarized light in a specific wavelength range of a visible light wavelength range is reduced, transmittance of polarized light in the other wavelength ranges is relatively increased by the reduction of the transmittance in the specific wavelength range, and thus there is a problem in that an exterior of the reflective polarizer is realized with a color in a wavelength range in which transmittance is relatively increased. Such a problem significantly occurs particularly with respect to light incident on the reflective polarizer in a non-normal line, it is difficult to adjust a color of a display due to such a problem, and a color feeling realized through the display is very poor. Furthermore, a significant difference in reflectivity of untargeted polarized light for each wavelength band as well as a significant difference in transmittance of targeted polarized light for each wavelength band further accelerates color defects. Furthermore, due to the reduction of the transmittance of the light in the specific wavelength range, the targeted polarized light reaching the liquid-crystal assembly is reduced, and thus problems such as brightness decrease and the like occur.

Therefore, in a first embodiment of the present invention, a reflective polarizer configured to transmit first polarized light parallel to a transmission axis and reflect second polarized light parallel to an extinction axis is provided. The above-described problems are addressed by providing the reflective polarizer, wherein reflectivity of the second polarized light in a wavelength range of 380 to 780 nm is 85% or more, and a reflectivity change ratio of the second polarized light in a wavelength range of 450 to 780 nm according to Equation 1 below is 0.05%/nm or less. Accordingly, in the reflective polarizer regardless of non-normal line incidence or normal line incidence of a light ray incident on the reflective polarizer, a mismatch in a refractive index in one specific direction is minimized, the transmittance of targeted polarized light within the visible light wavelength range is uniform, light transmitted through the reflective polarizer is not biased toward a specific wavelength range, and thus the exterior is not colorful like rainbow-color or a specific color. Also, because the reflectivity of untargeted polarized light is significantly large, the light is not biased toward a specific wavelength range, and the reflective polarizer may easily adjust the color throughout the visible light wavelength range, have the significantly excellent color, and exhibit excellent and uniform brightness.

First, before the reflective polarizer in the first embodiment of the present invention is described in detail, the first polarized light transmitted by the reflective polarizer and the second polarized light reflected by the reflective polarizer will be described in detail.

A degree of a substantial match or mismatch of the refractive indexes of the reflective polarizer according to X, Y, and Z axes in a space affects a degree of scattering of a light ray polarized along the axes. Generally, scattering ability is changed in proportion to square of a degree of a mismatch of the refractive indexes. Therefore, as a degree of a mismatch of refractive indexes according to a specific axis is increased, the light rays polarized along the axis are further scattered. On the contrary, as a degree of a mismatch of the refractive indexes according to the specific axis is reduced, the light rays polarized along the axis are scattered to a lesser extent. When a refractive index of an isotropic material of the reflective polarizer according to an axis substantially matches a refractive index of an anisotropic material, incident light polarized due to an electric field parallel to the axis passes through the reflective polarizer without being scattered. More particularly, the first polarized light (P wave) is transmitted without being influenced by a double-refraction interface formed at a boundary between the isotropic material and the anisotropic material, while the second polarized light (S wave) is influenced by the double-refraction interface formed at the boundary between the isotropic material and the anisotropic material and is modulated. Accordingly, the P wave is transmitted and the S wave is modulated by scattering or reflection of light, resulting in separation of the polarized light. The first polarized light (P wave) is transmitted through the reflective polarizer and reaches a liquid-crystal display (LCD) usually located above the reflective polarizer. With such a principle, the reflective polarizer acts to transmit one polarized light and reflect the other polarized light, the transmitted polarized light is polarized to be parallel to a transmission axis, and the reflected polarized light is polarized to be parallel to an extinction axis.

Meanwhile, in a reflective polarizer in which two layers having different refractive indexes are alternately stacked, as an angle of incident light, that is, an angle of light away from normal line incidence, is increased, a distance that the light passes through different media having different refractive indexes of the reflective polarizer is increased as compared with the case of normal line incidence. Accordingly, the transmittances of the first polarized light and the second polarized light which are polarized to be parallel to the transmission axis in the visible light wavelength range vary according to the incident angle of the incident light, and the first polarized light and the second polarized light have specific transmittance spectra for each wavelength at a specific incident angle.

However, changing the transmittance spectrum of the first polarized light for each wavelength every time the incident angle is changed means that the exterior of the reflective polarizer described above appears a specific color or rainbow-color according to the incident angle, and the brightness may be different according to a viewing angle. In order to address such a problem, the reflective polarizer preferably exhibits a constant transmittance spectrum of the first polarized light for each wavelength regardless of the incident angle and exhibits a constant reflectivity spectrum of the second polarized light for each wavelength regardless of the incident angle.

Further, even when the reflective polarizer has a uniform transmittance in the visible light wavelength range in the transmittance spectrum of the first polarized light for each wavelength according to a specific incident angle or a wavelength in which the transmittance is rapidly reduced in the spectrum, it is very preferable that the wavelength should be located in a region (ultraviolet region) having a smaller wavelength than visible light or a region (infrared ray region) having a greater wavelength than the visible light, and it is desirable that the wavelength is at least located near a region at which visible light and ultraviolet ray are adjacent or near a region at which visible light and infrared ray are adjacent.

Meanwhile, when the reflectivity of the second polarized light reflected by the reflective polarizer is not uniform in the visible light wavelength range, there is a possibility that color modulation control may fail even when the first polarized light has a uniform transmittance in the visible light wavelength range regardless of the incident angle of the incident light. More particularly, generally, a display backlight unit includes a reflective plate (or reflective film) below the reflective polarizer to improve brightness, and the reflective plate functions to reflect the second polarized light reflected by the reflective polarizer and re-incident the second polarized light on the reflective polarizer so that the second polarized light finally re-incident on the reflective polarizer is modulated to the first polarized light and passes through the reflective polarizer. When a difference in reflectivity of the second polarized light for each specific wavelength within the visible light wavelength range is large, a difference in an amount of the second polarized light re-incident on the reflective polarizer should be large. Therefore, the second polarized light for each wavelength band is modulated to the first polarized light to cause a difference in the amount of the first polarized light for each wavelength band transmitted through the reflective polarizer, and thus a color modulation phenomenon may occur.

As a result, even though any one reflective polarizer has a uniform transmittance of first polarized light in a visible light wavelength range, when reflectivity of second polarized light is not uniform, a variation of an amount of the first polarized light transmitted through the reflective polarizer may be significantly increased due to the other components of the product to which the reflective polarizer is applied, and thus color modulation may occur.

Accordingly, in the present invention, since the reflectivity of the second polarized light in a wavelength range of 380 to 780 nm according to a light ray having an incident angle of 45° is 85% or more, the reflectivity is very high, light loss is finally reduced, and thus brightness may be significantly improved. Further, since a reflectivity change ratio of the second polarized light in a wavelength range of 450 to 780 nm according to the light ray having an incident angle of 45° according to Equation 1 below is 0.05%/nm or less, the second polarized light has a very uniform reflectivity in the visible light wavelength range, which enables very good color modulation control, and thus the color of the exterior may be realized without any specific color being biased and the color of the display may be realized significantly excellent.

Figure 2:
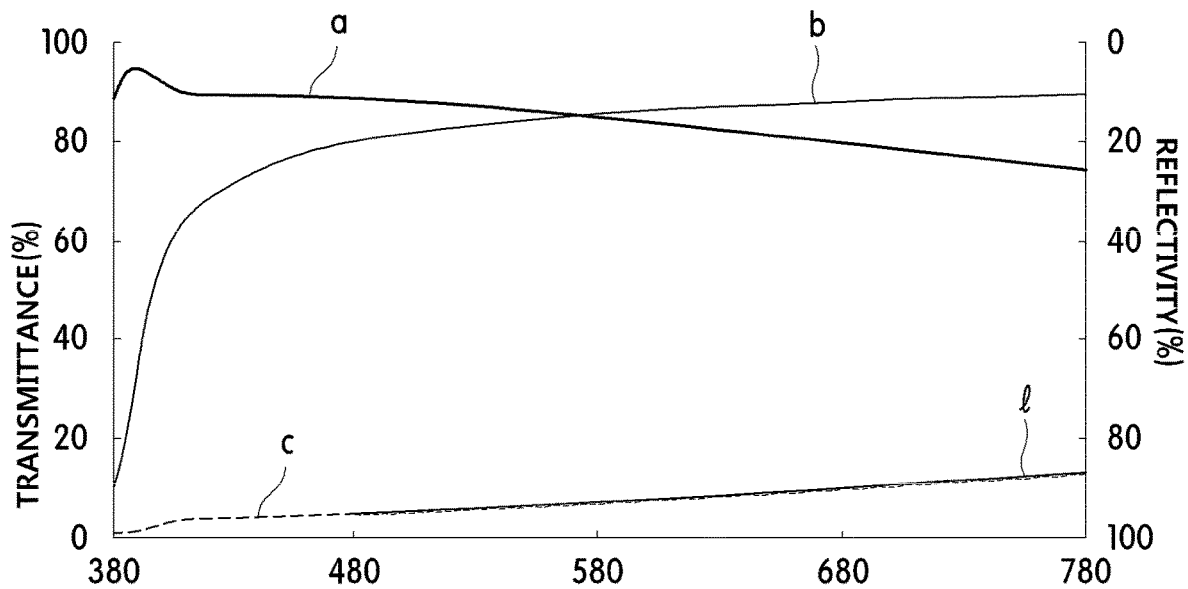
FIGS. 2 to 5 are transmittance spectra for each wavelength of first polarized light and second polarized light according to a light ray having an incident angle of 45°, according to one embodiment of the present invention.

Specifically FIG. 2 is a graph showing transmittance spectra of first polarized light and second polarized light for each wavelength according to a light ray having an incident angle of 45° according to one embodiment of the present invention. In FIG. 2, a spectrum (a) shows a polarization ratio according to the light ray having an incident angle of 45°, a spectrum (b) shows transmittance of the first polarized light according to the light ray having an incident angle of 45°, and a spectrum (c) shows transmittance (or reflectivity) of the second polarized light according to the light ray having an incident angle of 45°. In FIG. 2, reflectivity of the second polarized light in a wavelength range of 380 to 780 nm according to the light ray having an incident angle of 45° is the lowest around about 780 nm. It can be seen that because the reflectivity in this case is about 86%, the reflectivity of the second polarized light in a wavelength range of 380 to 780 nm in the visible light wavelength is 85% or more, and there is a room for re-compensation to the brightness by reducing light loss.

Further, in the first embodiment of the present invention, a reflectivity change ratio of the second polarized light in a wavelength range of 450 to 780 nm according to the light ray having an incident angle of 45° according to Equation 1 below is 0.05%/nm or less, more preferably, is 0.03%/nm or less, and a difference in the reflectivity for each wavelength is very small. Accordingly, the reflective polarizer may be prevented from exhibiting a specific color or a rainbow-color, color modulation control may be improved, and an excellent color may be realized on the display.

$$\text{reflectivity change ratio} = \left| \frac{R_2(\%) - R_1(\%)}{\lambda_2(nm) - \lambda_1(nm)} \right| \quad \text{[Equation 1]}$$

Here, $\lambda_1$ is 450 nm, $R_1$ denotes reflectivity of the second polarized light at $\lambda_1$, $\lambda_2$ is 780 nm, and $R_2$ denotes reflectivity of the second polarized light at $\lambda_2$.

The reflectivity change ratio of the reflective polarizer is a parameter that can determine a change of reflectivity of the second polarized light in a predetermined visible light wavelength region, particularly, in a wavelength range of 450 to 780 nm from blue to red. As the change of the reflectivity is reduced, the change of the reflectivity significantly increased or significantly reduced at a specific wavelength is reduced, the exterior of the reflective polarizer may not show a specific color, and an amount of transmission of the first polarized light for each wavelength band may be finally made uniform at a high level.

Specifically, in FIG. 2, the spectrum (b) and (c) are transmittance spectra of the first polarized light and the second polarized light for each wavelength according to the light ray having an incident angle of 45° according to one embodiment of the present invention. The reflectivity change ratio refers to a slope of a straight line 1 of FIG. 2, and it can be seen that the reflectivity change ratio is very small because the slope of the straight line 1 satisfies about 0.026%/nm and thus a variation of the reflectivity of the second polarized light for each wavelength is very small. Therefore, it can be expected that the color modulation control is very good.

Further, the second polarized light according to the light ray having an incident angle of 45° may have a visible light reflection uniformity of 5% or less, more preferably, have a visible light reflection uniformity of 3% or less, in a wavelength range of 480 to 580 nm, and have a visible light reflection uniformity of 7% or less in a wavelength range of 580 to 780 nm. Accordingly, the change of the reflectivity may be minimized, and the reflectivity of the second polarized light may be constant even in a wide wavelength range.

The visible light reflection uniformity refers to a difference between a maximum value and a minimum value of the reflectivity of the second polarized light in a specific wavelength range in the visible light wavelength range. As the visible light reflection uniformity is increased, the transmittance at a predetermined incident angle in the visible light wavelength range is finally uniform, and thus the exterior of the reflective polarizer with respect to the non-normal line may be realized close to white without a bias to any one color.

Figure 3:
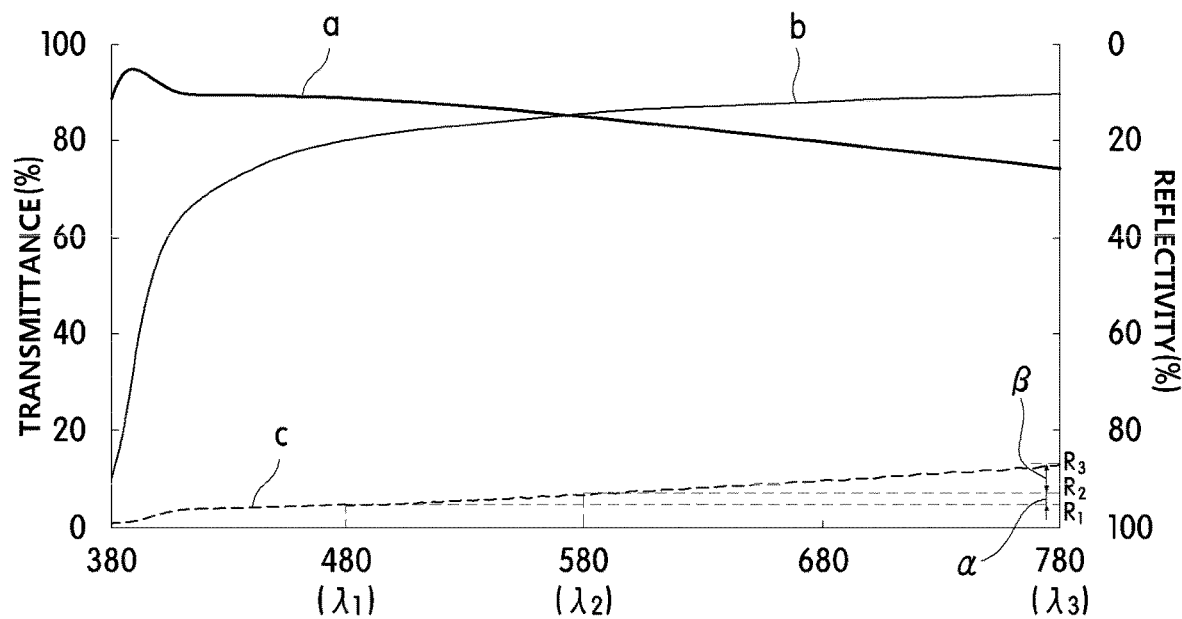

Specifically, FIG. 3 is a graph showing transmittance spectra of first polarized light and second polarized light for each wavelength according to a light ray having an incident angle of 45° according to one embodiment of the present invention. In FIG. 3, since a minimum value $R_2$ of reflectivity of the second polarized light in a wavelength range of 480 nm $\lambda_1$ to 580 nm $\lambda_2$ is about 93% and a maximum value $R_1$ thereof is about 95%, a visible light transmission uniformity α of the first polarized light in the wavelength range is 2%, and the transmission uniformity thereof is very excellent.

Further, in FIG. 3, since a minimum value $R_3$ of reflectivity of the second polarized light in a wavelength range of 580 nm $\lambda_2$ to 780 nm $\lambda_3$ is about 87% and a maximum value $R_2$ thereof is about 93%, a visible light reflection uniformity β of the first polarized light in the wavelength range is 6%, and the transmission uniformity thereof is very excellent. As a result, since the visible light reflection uniformity of the second polarized light in a wavelength range of 480 to 780 nm is 8% in the reflective polarizer in FIG. 3, the reflection uniformity is less than 10%, and thus physical properties thereof may be very excellent.

In the reflective polarizer according to one embodiment of the present invention, reflectivity of the second polarized light at a wavelength of 480 nm according to the light ray having an incident angle of 45° may range from 94 to 96%, reflectivity at a wavelength of 580 nm may range from 92 to 94%, reflectivity at a wavelength of 680 nm may range from 88 to 91%, and reflectivity at a wavelength of 780 nm may range from 85 to 88%. Such a tendency may be more clearly seen through the reflective polarizer of FIG. 3. In FIG. 3, it can be seen that the reflectivity of the second polarized light for each wavelength is reduced from 480 nm to 780 nm but a variation ratio of the reduction of the reflectivity is small. Accordingly, it can be seen that it is suitable for exhibiting targeted physical properties because an interval in which the reflectivity of the second polarized light is significantly reduced at any specific wavelength is not included, the variation of the reflectivity is small, and the transmittance is excellent.

Figure 4:
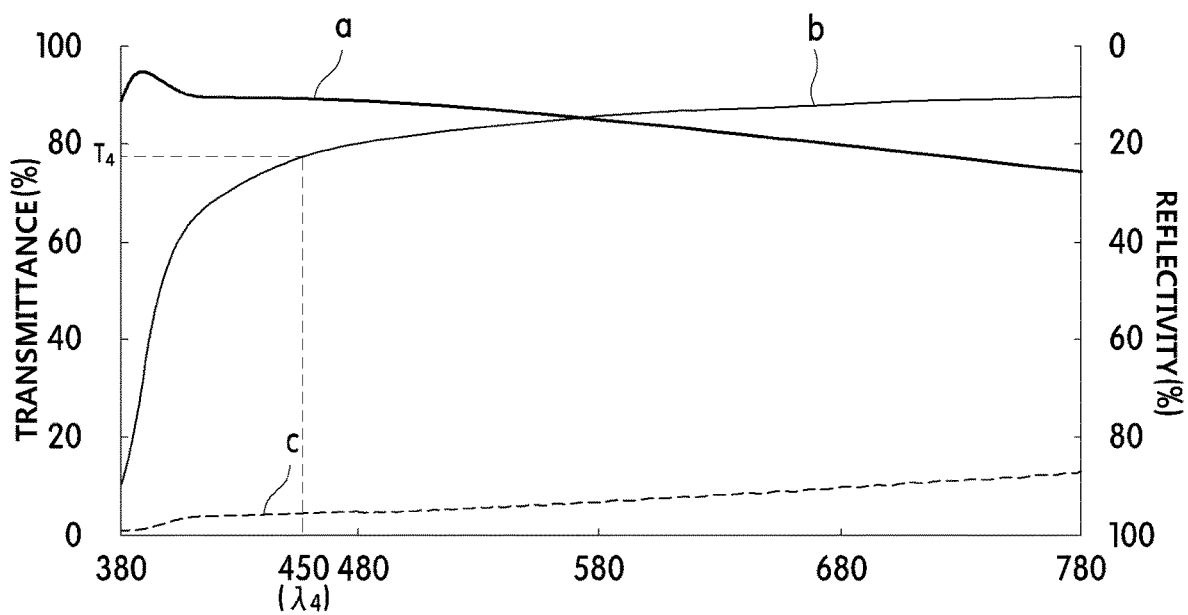

Meanwhile, according to one embodiment of the present invention, the first polarized light according to the light ray having an incident angle of 45° has transmittance of 72% or more in the wavelength range of 450 to 780 nm so that the transmittance of the first polarized light of the reflective polarizer may be very high and the excellent brightness may be realized. More preferably, the reflectivity of the second polarized light at the same wavelength as the wavelength of the first polarized light having the lowest transmittance among the transmittances of the first polarized light in the wavelength range is 95% or more, which is significantly high. Since the transmittance of the first polarized light which is re-compensated through the second polarized light reflected at the first wavelength corresponding to the minimum value of the transmittance of the first polarized light has a high possibility of significantly increasing, the brightness at the first wavelength may be significantly improved in the end. Specifically, FIG. 4 is a graph showing transmittance spectra of first polarized light and second polarized light for each wavelength according to a light ray having an incident angle of 45° according to one embodiment of the present invention. The first polarized light according to the light ray having an incident angle of 45° has minimum transmittance of about 76% at a wavelength of 450 nm $\lambda_4$ in the wavelength range of 450 to 780 nm, and reflectivity of the second polarized light at a wavelength $\lambda_4$ corresponding to the minimum transmittance is about 96%, which is very high, so that loss of the light is small in the end and the uniform first polarized light may be transmitted at the entire wavelength of the visible light.

Referring to FIG. 4, a sum of the transmittance of the first polarized light and the reflectivity of the second polarized light at a specific wavelength in the visible light wavelength region may be constant, and particularly, a sum of the transmittance (about 80%) of the first polarized light and the reflectivity (about 95%) of the second polarized light at a wavelength of 480 nm is about 175%, a sum of the transmittance (about 86%) of the first polarized light and the reflectivity (about 93%) of the second polarized light at a wavelength of 580 nm is about 179%, a sum of the transmittance (about 90%) of the first polarized light and the reflectivity (about 87%) of the second polarized light at a wavelength of 780 nm is about 177%, and thus the sums of the transmittance of the first polarized light and the reflectivity of the second polarized light are similar. Accordingly, the light compensation is finally processed and the transmittance of the first polarized light for each wavelength in the visible light wavelength range through which the first polarized light is transmitted may be similar, and an exterior of the reflective polarizer with respect to an incident angle in a non-normal line may be better realized close to white without a bias to any one color.

In the reflective polarizer according to one embodiment of the present invention, the first polarized light according to the light ray having an incident angle of 45° has a visible light transmission uniformity of 8% or less in a wavelength range of 480 to 580 nm, and has a visible light transmission uniformity of 5% in a wavelength range of 580 to 780 nm.

The visible light transmission uniformity refers to a difference between a maximum value and a minimum value of the transmittance of the first polarized light in a predetermined wavelength range of the visible light wavelength range. As the visible light transmission uniformity is increased, the transmittance at the predetermined visible light wavelength range is uniform, and thus the exterior of the reflective polarizer with respect to the non-normal line may be realized close to white without a bias to any one color.

Figure 5:
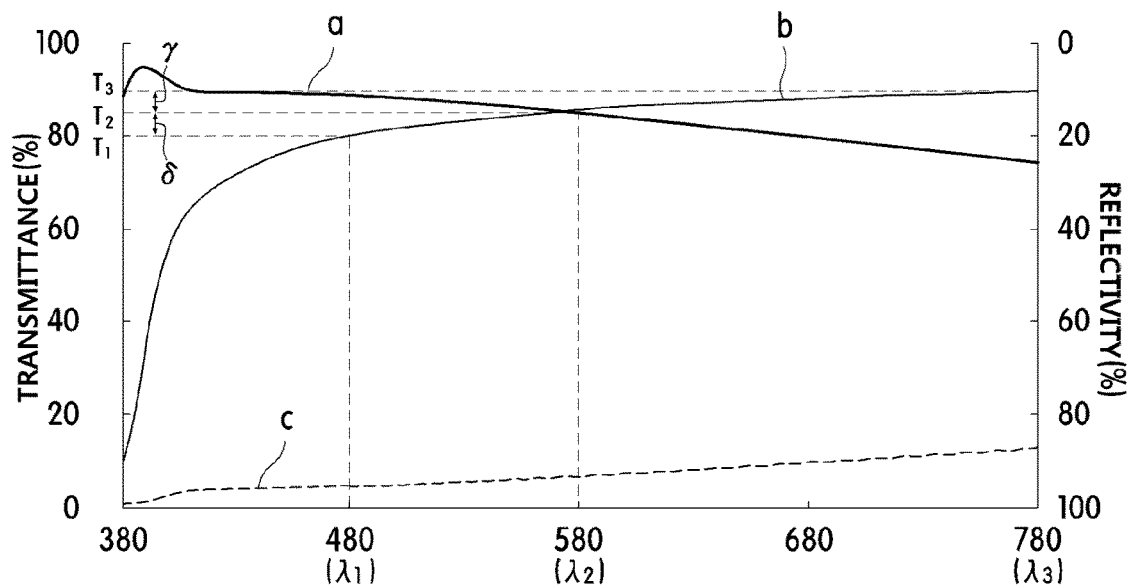

Specifically, FIG. 5 is a graph showing transmittance spectra of first polarized light and second polarized light for each wavelength according to a light ray having an incident angle of 45° according to one embodiment of the present invention. In FIG. 5, it can be confirmed that since a minimum value $T_1$ of transmittance of the first polarized light in a wavelength range of 480 nm $\lambda_1$ to 580 nm $\lambda_2$ is about 80% and a maximum value $T_2$ thereof is about 86%, a visible light transmission uniformity γ of the first polarized light in the wavelength range is 6%, and the transmission uniformity thereof is very excellent.

Next, a reflective polarizer according to a second embodiment of the present invention will be described.

In the reflective polarizer according to the second embodiment of the present invention, which transmits first polarized light parallel to a transmission axis and reflects second polarized light parallel to an extinction axis, a difference between maximum transmittance and minimum transmittance of the first polarized light according to a light ray having an incident angle of 45 in a wavelength range of 450 to 780 nm may be 20% or less, and preferably, may be 15% or less. When the difference between the maximum transmittance and the minimum transmittance is more than 20%, the transmittance may be different for each wavelength and the brightness may be different for each wavelength, and thus there may be a problem in that targeted physical properties may not be realized because a color of the wavelength exhibiting relatively high brightness may be clearly shown and color control may not be achieved as desired.

Specifically, in FIG. 2, when the incident angle is 45°, since the maximum transmittance of the first polarized light at the wavelength of 780 nm in the wavelength range of 450 to 780 nm is 90% and the minimum transmittance of the first polarized light at the wavelength of 450 nm is 76%, a difference between the maximum transmittance and the minimum transmittance is only 14%, and the transmittance is very uniform in the wavelength range of 450 to 780 nm. In consideration of the first polarized light that can be compensated by the second polarized light reflected in the wavelength range, it can be expected that the first polarized light has a very similar transmittance for each wavelength in the above wavelength range, and thus more excellent brightness may be obtained and color control may be achieved.

Next, a reflective polarizer according to a third embodiment of the present invention will be described.

In the reflective polarizer according to the third embodiment of the present invention, which transmits first polarized light parallel to a transmission axis and reflects second polarized light parallel to an extinction axis, a difference between first transmittance (%) of the first polarized light according to a light ray having an incident angle of 90° at a wavelength of 580 nm and second transmittance (%) of the first polarized light according to a light ray having an incident angle of 45° at a wavelength of 580 nm may be 8% or less. Since the difference between the first transmittance and the second transmittance is 8% or less, the difference in the transmittance in a specific wavelength range (580 nm) is 8% or less, which is significantly small, even when the incident angle of light incident on the reflective polarizer is changed. Therefore, a light viewing angle may be very wide, and the reflective polarizer, which exhibits significant excellent color control and excellent brightness even when the incident angle of the incident light is changed, may be implemented. The difference in the transmittance may preferably be less than 5%, more preferably, may be less than 3%, and more preferably, may be less than 1%.

In the reflective polarizer, a difference between third transmittance (%) of the first polarized light according to the light ray having an incident angle of 90° at a wavelength of 450 nm and fourth transmittance (%) of the first polarized light according to the light ray having an incident angle of 45° at a wavelength of 450 nm may preferably satisfy 5% or less, and more preferably, a difference between fifth transmittance (%) of the first polarized light according to the light ray having an incident angle of 90° at a wavelength of 780 nm and sixth transmittance (%) of the first polarized light according to the light ray having an incident angle of 45° at a wavelength of 780 nm may satisfy 5% or less, and thus it can be confirmed that the transmittance of the first polarized light in a specific wavelength range in the wavelength range of 450 to 780 nm is uniform regardless of the incident angle of the incident light and thus it is suitable for implementing targeted physical properties.

Meanwhile, detailed descriptions of problems of the related art relating to color modulation and the like according to the present invention and the transmittance and the reflectivity of the first polarized light and the second polarized light for each wavelength according to the present invention may be given by adding Korean Patent Application No. 2014-0195659 by the inventors of the present invention.

Meanwhile, the reflective polarizer of FIG. 2, which may satisfy the conditions of the transmittance of the first polarized light and the reflectivity of the second polarized light according to the first to third embodiments of the present invention, may preferably be a polymer dispersed reflective polarizer including a base material and a plurality of dispersed bodies which are dispersed inside the base material, and more preferably, be a randomly dispersed reflective polarizer in which the dispersed bodies are randomly dispersed inside a base material. Since the dispersed bodies should form a double-refraction interface with the base material to cause a light modulation effect, the dispersed bodies may have a double-refraction property when the base material is optically isotropic, and on the contrary, the dispersed bodies may have optical isotropy when the base material has an optical double-refraction property. Specifically, when a refractive index of the dispersed body in an x-axis direction is $nX_1$, a refractive index in a y-axis direction is $nY_1$, a refractive index in a z-axis direction is $nZ_1$, a refractive index of the base material in the x-axis direction is $nX_2$, a refractive index in the y-axis direction is $nY_2$, and a refractive index in the z-axis direction is $nZ_2$, double-refraction in plane may occur between $nX_1$ and $nY_1$. More preferably, at least one of the refractive indexes of the base material and the dispersed body in the x-axis, y-axis, and z-axis directions may be different from the others, and more preferably, when an elongation axis is the x-axis, a difference in the refractive index in each of the y-axis and z-axis directions may be 0.05 or less and a difference in the refractive index in the x-axis direction may be 0.1 or more. Meanwhile, when the difference in the refractive index is 0.05 or less, this case is generally interpreted as matching.

Meanwhile, each of the plurality of dispersed bodies may have an appropriate optical thickness in the visible light wavelength range and a thickness deviation within an appropriate range in order to transmit the targeted first polarized light and reflect the untargeted second polarized light. The optical thickness refers to n (refractive index) >d (physical thickness). Meanwhile, a wavelength and an optical thickness of light are defined by the following Relational Expression 1.

$$\lambda = 4nd \qquad \text{[Relational Expression 1]}$$

Here, λ denotes the wavelength (nm) of the light, n denotes the refractive index, and d denotes a physical thickness (nm).

Therefore, when an average optical thickness of the dispersed bodies is 150 nm, the second polarized light having a wavelength of 600 nm may be reflected by Relational Expression 1. When an optical thickness of each of the plurality of dispersed bodies is adjusted by such a principle, reflectivity of the second polarized light in a targeted wavelength range, and particularly, in a visible light wavelength range may be significantly increased.

Accordingly, in the reflective polarizer capable of exhibiting the physical properties as described in FIG. 2, at least two of the plurality of dispersed bodies may have difference cross-sectional areas in a direction in which the dispersed bodies are elongated, and thus cross-sectional diameters (corresponding to the optical thicknesses) of the dispersed bodies may be different so that the second polarized light having the wavelength corresponding to the optical thickness may be reflected. When the reflective polarizer includes a polymer having an optical thickness corresponding to each wavelength of visible light, second polarized light corresponding to the visible light region may be reflected.

Meanwhile, in the reflective polarizer according to one embodiment of the present invention, the plurality of dispersed bodies are dispersed inside the base material, and the plurality of dispersed bodies may be randomly dispersed for each thickness without forming groups or layers inside the base material.

Specifically, a conventionally disclosed multilayer reflective polarizer in which different medium layers having different refractive indexes are alternately stacked are manufactured with at least 300 layers so as to cover the entire visible light wavelength range for each thickness. When the medium layer is a flat plate-shaped layer having a constant thickness, distances that incident light travels through the medium layer when the incident light is incident in the non-normal line and the normal line are different, and thus control of second polarized light parallel to a reflection axis may not easy. In order to make the control of the second polarized light parallel to the reflection axis in a specific wavelength region more easier, a conventional multilayer reflective polarizer controls transmittance of the first polarized light or the second polarized light in a specific wavelength region, that is a problematic, by grouping and stacking multiple layers of 2 to 4 layers for each thickness. However, when the plurality of layers are grouped and stacked for each thickness and the groups are stacked, the control of the transmittance of the second polarized light at all wavelength in the entire visible light region may not be uniformly performed.

However, the reflective polarizer according to one embodiment of the present invention includes a plurality of dispersed bodies having different cross-sectional diameters in order to cover a visible light wavelength region inside a base material. The dispersed bodies are randomly dispersed inside the base material regardless of their cross-sectional diameters while any layer is formed inside the base material or layers are grouped and not provided in the base material for each cross-sectional diameter, and thus there is an advantage in that control of reflectivity of the second polarized light may be very excellent in the entire visible light region and a deviation of the reflectivity for each wavelength may be small and uniform.

A shape of each of the plurality of dispersed bodies is not particularly limited as long as it can exhibit the physical properties as shown in FIG. 2. Specifically, the shape of each of the plurality of dispersed bodies may be circular, elliptical, or the like. The total number of the dispersed bodies may be 25,000,000 to 80,000,000 when a thickness of the base material is 120 μm based on a 32 inch, but the present invention is not limited thereto.

When the shape of the dispersed body is circular or elliptical, an incident angle of light incident on the reflective polarizer in a non-normal line is almost the same as that in the normal line, and thus there is an advantage in that transmittance spectrum curves of the first polarized light and/or the second polarized light for each wavelength may be almost similar regardless of normal line incidence and non-normal line incidence.

A component of the base material and the dispersed body may be used without limitation as long as the component is a material which is usually used to form a double-refraction interface in the reflective polarizer. The component of the base material may be preferably selected from the group consisting of polyethylene naphthalate (PEN), co-polyethylene naphthalate (co-PEN), polyethylene terephthalate (PET), polycarbonate (PC), a PC alloy, polystyrene (PS), heat-resistant PS, polymethylmethacrylate (PMMA), polybutylene terephthalate (PBT), polypropylene (PP), polyethylene (PE), acrylonitrile butadiene styrene (ABS), polyurethane (PU), polyimide (PI), polyimide Polyvinyl chloride (PVC), styrene acrylonitrile blend (SAN), ethylene vinyl acetate (EVA), polyamide (PA), polyacetal (POM), phenol, epoxy (EP), urea (UF), melanin (MF), unsaturated polyesters (UP), silicon (SI), and a cycloolefin polymer, and may more preferably be PEN.

The component of the dispersed body may be preferably selected from the group consisting of PEN, co-PEN, PET, PC, a PC alloy, PS, heat-resistant PS, PMMA, PBT, PP, PE, ABS, PU, PI, PVC, SAN, EVA, PA, POM, phenol, EP, UF, MF, UP, SI, and a cycloolefin polymer alone or in a mixture thereof, and may more preferably be co-PEN appropriately polymerized with monomers such as dimethyl-2,6-naphthalene dicarboxylate, dimethyl terephthalate, ethylene glycol, cyclohexanedimethanol (CHDM), and the like.

The polymer-dispersed reflective polarizer may be elongated in at least one direction to form a double-refraction interface between the base material and the dispersed bodies.

Meanwhile, more preferably, the plurality of dispersed bodies may be randomly dispersed inside the base material. Accordingly, the reflective polarizer capable of exhibiting the physical properties as described in FIG. 2 may be easily implemented, and the reflective polarizer in which problems such as light leakage and bright line appearance are offset as compared with the conventional reflective polarizer may be implemented.

Specifically, in a randomly dispersed reflective polarizer, which is more advantageous for achieving the excellent physical properties to be addressed by the present invention by exhibiting the physical properties as shown in FIG. 2, the randomly dispersed reflective polarizer includes a base material and a plurality of dispersed bodies which are included in the base material to transmit first polarized light applied from the outside and reflect second polarized light. The plurality of dispersed bodies have a refractive index different from that of the base material in at least one axial direction, at least 80% of the plurality of dispersed bodies included in the base material have an aspect ratio of a minor axis length with respect to a major axis length is 1/2 or less based on a cross section in a longitudinal direction, and the dispersed bodies having an aspect ratio of 1/2 or less include at least three groups according to the cross-sectional area. The randomly dispersed reflective polarizer may be a randomly dispersed reflective polarizer in which a cross-sectional area of each of the dispersed bodies in a first group among the groups may range from 0.2 to 2.0 $\mu m^2$, a cross-sectional area of each of the dispersed bodies in a second group may be greater than 2.0 $\mu m^2$ and 5.0 $\mu m^2$ or less, a cross-sectional area of each of the dispersed bodies in a third group may be greater than 5.0 $\mu m^2$ and 10.0 $\mu m^2$ or less, and the dispersed bodies in the first to third groups are randomly dispersed. Such a reflective polarizer may be more advantageous for achieving the above-described excellent physical properties.

The randomly dispersed reflective polarizer may include the above-described base material and the plurality of dispersed bodies included inside the base material, and a reflective polarizer including the plurality of dispersed bodies, which satisfies the dispersed body conditions according to the embodiment described above, may be set to a core layer. The randomly dispersed reflective polarizer may have a structure including an integrated skin layer formed on at least one surface of the core layer. The randomly dispersed reflective polarizer may further provide the skin layer to contribute protection of the core layer and improvement of reliability of the reflective polarizer.

A reflective polarizer according to one embodiment that does not include a skin layer and a reflective polarizer according to another embodiment that includes a skin layer may differ in use, and the reflective polarizer including the skin layer may be preferably used for general-purpose LCDs such as a display and the like. As a potable LCD, for example, a portable electronic device, a smart electronic device, or a smart phone, requires a slimmed reflective polarizer, the reflective polarizer not including the skin layer may be preferably used, but the present invention is not limited thereto.

Figure 6:
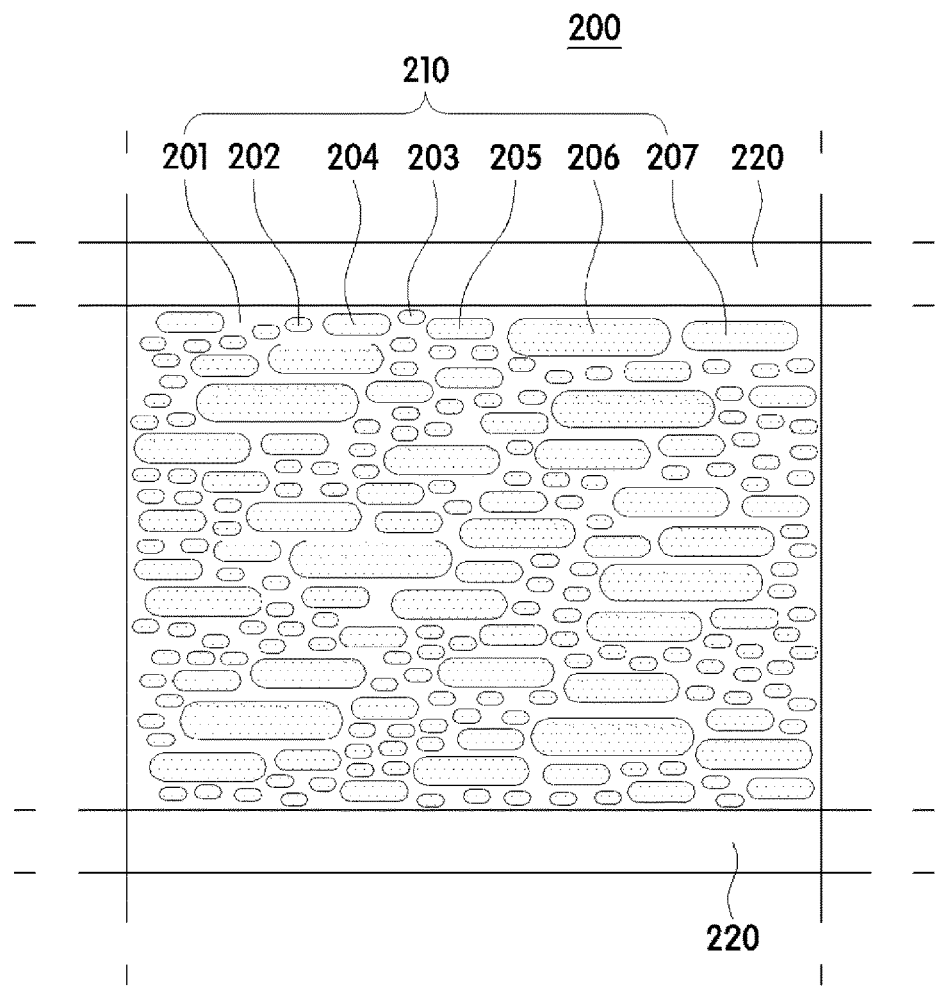
FIG. 6 is a cross-sectional view of a randomly dispersed reflective polarizer according to one embodiment of the present invention.

Specifically, FIG. 6 is a cross-sectional view of the randomly dispersed reflective polarizer, and illustrates a core layer 210 in which a plurality of dispersed bodies 212 to 217 are randomly dispersed inside a base material 201 and an integrated skin layer 220 formed on at least one surface of the core layer.

First, in the core layer 210, at least 80% of the plurality of dispersed bodies included in the base material should have an aspect ratio of a minor axis length to a major axis length of 1/2 or less, and more preferably, at least 90% of the plurality of dispersed bodies may satisfy the aspect ratio value of 1/2 or less.

Figure 7:
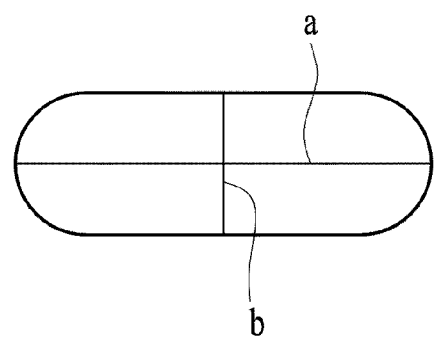
FIG. 7 is a longitudinal sectional view of a dispersed body used in a randomly dispersed reflective polarizer according to one embodiment of the present invention.

Specifically, FIG. 7 is a longitudinal sectional view of the dispersed body used in the randomly dispersed reflective polarizer according to one embodiment of the present invention. When a major axis length is referred to as a and a minor axis length is referred to as b, a relative ratio (an aspect ratio) of the minor axis length b to the major axis length a should be 1/2 or less. In other words, when the major axis length a is 2, the minor axis length b should be smaller than or equal to 1, which is 1/2 thereof. When the dispersed bodies having a ratio of the minor axis length to the major axis length being greater than 1/2 are included in 20% or more of the total number of the dispersed bodies, it is difficult to achieve targeted optical properties.

The dispersed bodies having the aspect ratio of 1/2 or less include three or more groups having different cross-sectional areas. Specifically, in FIG. 6, all of dispersed bodies 202 and 203 in a first group having the smallest cross-sectional area, dispersed bodies 204 and 205 in a second group having an intermediate cross-sectional area, and dispersed bodies 206 and 207 in a third group having the largest cross-sectional area are randomly dispersed. In this case, the cross-sectional area of the first group ranges from 0.2 to 2.0 $\mu m^2$, the cross-sectional area of the second group is greater than 2.0 $\mu m^2$ and 5.0 $\mu m^2$ or less, the cross-sectional area of the third group is greater than 5.0 $\mu m^2$ and 10.0 $\mu m^2$ or less, and the dispersed bodies in the first to third groups are randomly arranged. When the dispersed bodies in any one of the first to third groups are not included, it is difficult to achieve targeted optical properties.

In this case, preferably, the number of the dispersed bodies in the third group among the dispersed bodies having the aspect ratio of 1/2 or less may be 10% or more. When the number of the dispersed bodies in the third group is less than 10%, improvement of optical properties may be insufficient. More preferably, the number of the dispersed bodies corresponding to the first group of the dispersed bodies having the aspect ratio of 1/2 or less may satisfy 30 to 50%, the number of the dispersed bodies corresponding to the third group may satisfy 10 to 30%, and thus the optical properties may be improved.

Meanwhile, more preferably, the number of dispersed bodies in the first group divided by the number of dispersed bodies in the third group is 3 to 5, it may be very advantageous to maximize the optical properties.

Preferably, the number of the dispersed bodies corresponding to the second group among the dispersed bodies having the aspect ratio of 1/2 or less may satisfy 25 to 45%. Further, the dispersed bodies which are out of the range of the cross-sectional areas of the dispersed bodies in the first to third groups may be additionally included in the dispersed bodies having the aspect ratio of 1/2 or less. Accordingly, as compared with the conventional dispersed reflective polarizer, a light viewing angle may be increased while improving a bright line appearance phenomenon and brightness may be maximized while minimizing light loss.

Figure 8:
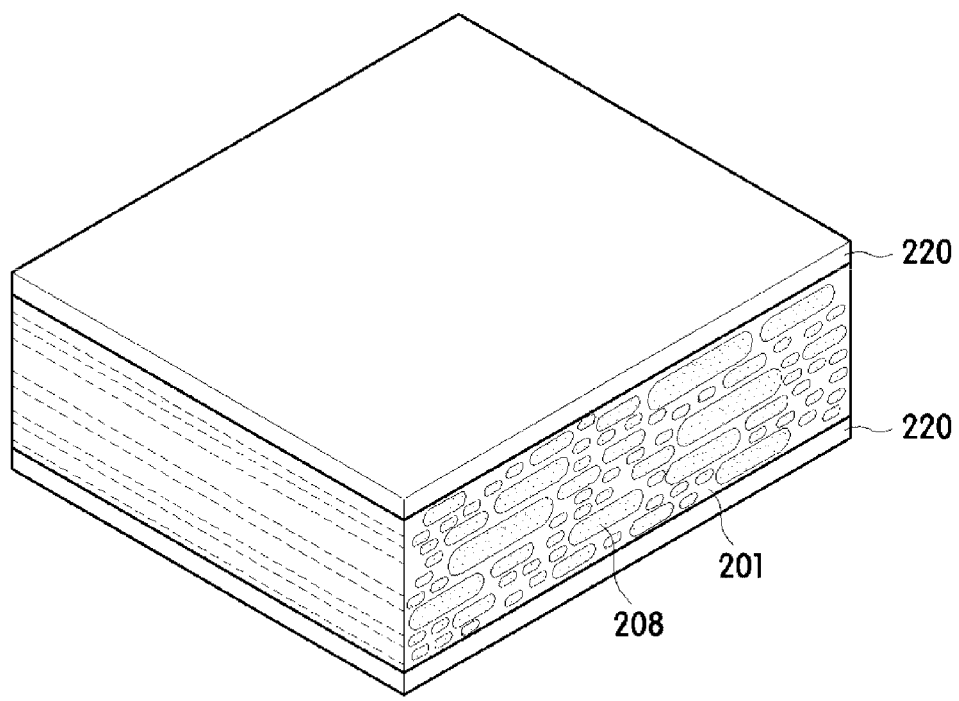
FIG. 8 is a perspective view of a reflective polarizer included in one embodiment of the present invention.

FIG. 8 is a perspective view of a reflective polarizer included in one embodiment of the present invention. A plurality of randomly dispersed bodies 208 may be elongated inside a base material 201 of a core layer 210 in a longitudinal direction, and a skin layer 220 may be formed above and/or below the core layer 210. In this case, the randomly dispersed bodies 208 may be elongated in various directions, preferably elongating the randomly dispersed bodies 208 in parallel in any one direction is advantageous, and more preferably, elongating the randomly dispersed bodies 208 in a direction perpendicular to light emitted from an external light source to be parallel to elongation bodies is effective in maximizing the light modulation effect.

According to one embodiment of the present invention, a double-refraction interface may be formed between the dispersed bodies (a first component) included in the base material and the base material (a second component). Specifically, in a reflective polarizing film including dispersed bodies inside a base material, a degree of a substantial match or mismatch of refractive indexes according to X, Y and Z axes in space between the base material and the dispersed bodies affects a degree of scattering of the polarized light ray along the axis thereof. Generally, scattering ability is changed in proportion to square of a degree of a mismatch of the refractive indexes. Therefore, as a degree of a mismatch of the refractive indexes according to a specific axis is increased, the light rays polarized along the axis are further scattered. On the contrary, when the degree of the mismatch of the refractive indexes according to the specific axis is small, the light rays polarized along the axis are scattered to a lesser extent. When a refractive index of the base material according to an axis substantially matches a refractive index of the dispersed body, incident light polarized due to an electric field parallel to the axis passes through the reflective polarizer without being scattered regardless of the magnitude, shape, and density of the dispersed body. When the refractive index of the base material according to the axis substantially matches the refractive index of the dispersed body, the light ray passes through an object without being substantially scattered. More particularly, the first polarized light (P wave) is transmitted without being influenced by a double-refraction interface formed at a boundary between the base material and the dispersed body, while the second polarized light (S wave) is influenced by a double-refraction interface formed at the boundary between the base material and the dispersed body and is modulated. Accordingly, the P wave is transmitted and the S wave is modulated by scattering or reflection of light, resulting in separation of the polarized light.

Therefore, since the base material and the dispersed bodies should form a double-refraction interface to cause a light modulation effect, the dispersed bodies may have a double-refraction property when the base material is optically isotropic, and on the contrary, the dispersed bodies may have optical isotropy when the base material has an optical double-refraction property. Specifically, when a refractive index of the dispersed body in an x-axis direction is $nX_1$, a refractive index in a y-axis direction is $nY_1$, a refractive index in a z-axis direction is $nZ_1$, a refractive index of the base material in the x-axis direction is $nX_2$, a refractive index in the y-axis direction is $nY_2$, and a refractive index in the z-axis direction is $nZ_2$, double-refraction in plane may occur between $nX_1$ and $nY_1$. More preferably, at least one of the refractive indexes of the base material and the dispersed body in the x-axis, y-axis, and z-axis directions may be different from the others, and more preferably, when an elongation axis is the x-axis, a difference between the refractive index in each of the x-axis and y-axis directions may be 0.05 or less and a difference in the refractive index in the x-axis direction may be 0.1 or more. Meanwhile, when the difference in the refractive index is 0.05 or less, this case is generally interpreted as matching.

A thickness of the core layer may preferably range from 20 to 350 µm, and more preferably, may range from 50 to 250 µm, but the present invention is not limited thereto. The thickness of the core layer may be designed according to the specific use, whether the skin layer is included, and the thickness of the skin layer. The total number of the dispersed bodies may be 25,000,000 to 80,000,000 and the thickness of the base material is 120 µm based on a 32 inch, but the present invention is not limited thereto.

Next, the skin layer 220, which may be included in at least one surface of the core layer, will be described. A conventionally used component is used as the skin layer, and may be used without limitation as long as it is usually used in a reflective polarizing film. A component of the base material may be preferably selected from the group consisting of PEN, co-PEN, PET, PC, a PC alloy, PS, heat-resistant PS, PMMA, PBT, PP, PE, ABS, PU, PI, PVC, SAN, EVA, PA, POM, phenol, EP, UF, MF, UP, SI, and a cycloolefin polymer alone or in a mixture thereof, and may more preferably be co-PEN appropriately polymerized with monomers such as dimethyl-2,6-naphthalene dicarboxylate, dimethyl terephthalate, ethylene glycol, CHDM, and the like.

The thickness of the skin layer may range from 30 to 500 µm, but the present invention is not limited thereto.

Meanwhile, when the skin layer is formed, the skin layer is also integrally formed between the core layer 210 and the skin layer 220. As a result, degradation of the optical properties due to an adhesive layer may be prevented, and more layers may be added within a limited thickness, so that the optical properties may be significantly improved. Furthermore, since the skin layer is simultaneously manufactured with the core layer and then an elongation process is performed, the skin layer of the present invention may be elongated in at least one axial direction, unlike the case in which a conventional core layer is elongated and then a non-elongated skin layer is attached thereto. Accordingly, surface hardness of the skin layer may be improved as compared with the non-elongated skin layer, and thus scratch resistance may be improved and the heat resistance may be improved.

Meanwhile, the randomly dispersed reflective polarizer which is advantageous for achieving excellent optical properties according to the present invention may be added with reference to Korean Patent Application No. 2013-0169215 and No. 2013-0169217 by the same applicant.

The reflective polarizer in which the dispersed bodies are randomly dispersed in the base material as described above may be manufactured by a manufacturing method which will be described below. However, the present invention is not limited thereto. First, the component of the base material and the components of the dispersed bodies may be supplied to separate extruded portions, and in this case, two extruded portions may be provided. In the present invention, one extruded portion including a separate supply path and a distribution path is provided so that polymers are not mixed. The extruded portion may be an extruder, which may further include a heating unit or the like to convert the supplied polymers in a solid phase into a liquid phase.

It is designed that the components of the dispersed bodies are arranged in the component of the base material so that a flow property and viscosity of the component of the base material is different from a flow property and viscosity of the components of the dispersed bodies, and preferably, the flow property of the component of the base material is more than that of the components of the dispersed bodies. Next, a reflective polarizer in which the dispersed bodies are randomly arranged may be manufactured using a difference between the viscosity of the component of the base material and the viscosity of the components of the dispersed bodies while the component of the base material and the components of the dispersed bodies pass through a mixing zone and a mesh filter zone.

Then, when the skin layer is included in at least one surface of the manufactured reflective polarizer, the at least one surface of the reflective polarizer is joined to a component of the skin layer transferred from the extruded portion. Preferably, the component of the skin layer may be joined to both surfaces of the reflective polarizer. When the skin layer is joined to both surfaces of the reflective polarizer, materials and thicknesses of the skin layers may be the same or difference from each other.

Figure 9:
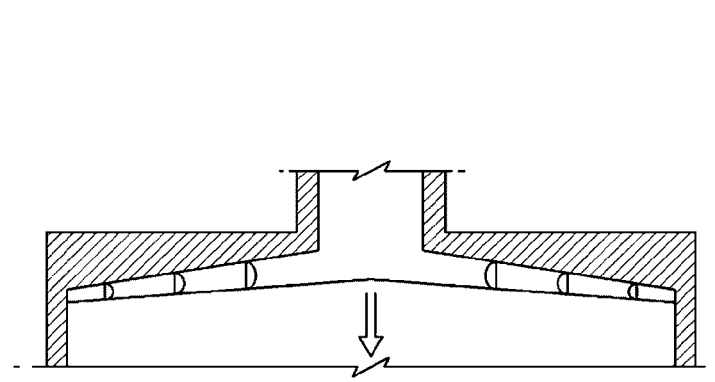
FIG. 9 is a cross-sectional view of a coat-hanger die, which is a type of a flow control unit preferably applicable to the present invention.
Figure 10:
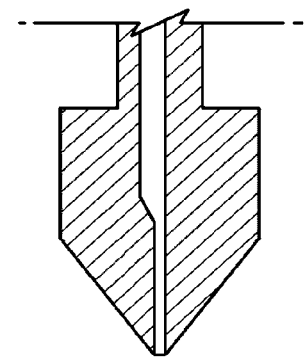
FIG. 10 is a side view of FIG. 9.

Then, a flow control unit induces spreading the components of the dispersed bodies so that the components of the dispersed bodies included in the component of the base material may be randomly arranged. Specifically, FIG. 9 is a cross-sectional view of a coat-hanger die, which is a type of the flow control unit preferably applicable to the present invention, and FIG. 10 is a side view of FIG. 9. A size of the cross-sectional area of each of the components of the dispersed bodies and the arrangement of the components of the dispersed bodies may be randomly adjusted by appropriately adjusting a degree of spreading of the base material. In FIG. 9, since the base material to which the skin layer transferred through the flow path is joined spreads widely in the coat-hanger die from side to side, the components of the dispersed bodies therein also spread from side to side.

According to one embodiment of the present invention, the manufacturing method may further include cooling and smoothing the reflective polarizer in which the spreading is induced and which is transferred from the flow control unit, elongating the reflective polarizer on which the smoothing is performed, and thermally fixing the elongated reflective polarizer.

First, in the cooling and smoothing of the reflective polarizer transferred from flow control unit, the reflective polarizer which is used in the manufacturing of the conventional reflective polarizer is cooled and solidified, and the smoothing of the reflective polarizer may be performed using a casting roll process or the like.

Then, the elongating of the reflective polarizer on which the smoothing step is performed is performed.

The elongation may be performed using a conventional elongation process of the reflective polarizer, and thus a difference in a refractive index between the component of the base material and the components of the dispersed bodies may be induced and a light modulation phenomenon may be caused at an interface therebetween and an aspect ratio of the spread-induced first component (the components of the dispersed bodies) is further reduced through the elongation. To this end, uniaxial elongation or biaxial elongation may be preferably performed as an elongation process, and more preferably, the uniaxial elongation may be performed. In the case of the uniaxial elongation, the elongation may be performed in a longitudinal direction of the first component. Further, an elongation ratio may range from 3 to 12 times. Meanwhile, a method of changing an isotropic material to a double refraction property is commonly known. For example, in the case in which the elongating is performed under appropriate temperature conditions, the dispersed body molecules may be aligned so that a material thereof becomes the double refraction property.

Next, the final reflective polarizer may be manufactured by performing the thermally fixing of the elongated reflective polarizer. The thermal fixing may be thermally fixed using a conventional method, and may be preferably performed at 180 to 200° C. for 0.1 to 3 minutes by an infrared (IR) heater.

The reflective polarizer satisfying the above-described physical properties according to the present invention may be employed to a light source assembly or an LCD including the same, and may be used to improve light efficiency. The light source assembly is divided into a direct light source assembly in which a lamp is located at a lower portion thereof, an edge type light source assembly in which a lamp is located at a side thereof, and the like. The reflective polarizers according to the embodiments may be employed to any kind of light source assembly. Also, the reflective polarizers according to the embodiments may be applied to a back light assembly disposed below a liquid-crystal panel or a front light assembly disposed above the liquid-crystal panel. Hereinafter, as an example of various applications, the case in which the reflective polarizer is applied to an LCD including an edge type light source assembly is illustrated.

Figure 11:
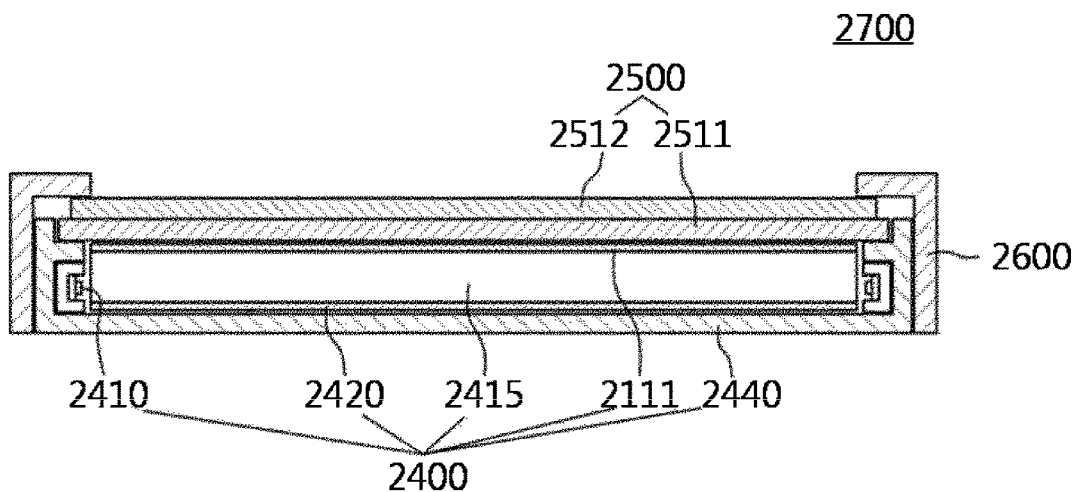
FIG. 11 is a cross-sectional view of a liquid-crystal display (LCD) according to one embodiment of the present invention.

FIG. 11 is a cross-sectional view of an LCD according to one embodiment of the present invention. An LCD 2700 includes a backlight unit 2400 and a liquid-crystal panel assembly 2500.

The backlight unit 2400 includes a reflective polarizer 2111 which modulates optical properties of emitted light. In this case, the other components included in the backlight unit and a positional relationship between the reflective polarizer 2111 and the other components may vary according to the purpose, and thus the present invention is not limited thereto.

However, according to one embodiment of the present invention, as illustrated in FIG. 9, the backlight unit 2400 may include light sources 2410, a light guide plate 2415 which guides light emitted from the light source 2410, a reflective film 2320 disposed below the light guide plate 2415, and the reflective polarizer 2111 disposed above the light guide plate 2415.

In this case, the light sources 2410 are disposed at both sides of the light guide plate 2415. For example, a light-emitting diode (LED), a cold cathode fluorescent lamp (CCFL), a hot cathode fluorescent lamp (HCFL), an external electrode fluorescent lamp (EEFL), or the like may be used as the light sources 2410. In another embodiment, the light source 2410 may be disposed only at one side of the light guide plate 2415.

The light guide plate 2415 moves the light emitted from the light source 2410 through total internal reflection and emits the light through a scattering pattern or the like formed on a lower surface of the light guide plate 2415. The reflective film 2420 is disposed below the light guide plate 2415 to reflect the light emitted downward from the light guide plate 2415 upward.

The reflective polarizer 2111 is disposed above the light guide plate 2415. Since the reflective polarizer 2111 is described above, repetitive descriptions thereof will be omitted. Other optical sheets may be further disposed above or below the reflective polarizer 2111. For example, a liquid crystal film which partially reflects incident circularly polarized light, a phase difference film and/or a protective film which converts circularly polarized light into linearly polarized light may be further provided.

Further, the light sources 2410, the light guide plate 2415, the reflective film 2420, and the reflective polarizer 2111 may be accommodated in a bottom chassis 2440.

The liquid-crystal panel assembly 2500 may include a first display plate 2511, a second display plate 2512, and a liquid-crystal layer (not illustrated) interposed between the first display plate 2511 and the second display plate 2512, and may further include a polarizer (not illustrated) attached to a surface of each of the first display plate 2511 and the second display plate 2512.

The LCD 2700 may further include a top chassis 2600 which covers edges of the liquid-crystal panel assembly 2500 and surrounds side surfaces of the liquid-crystal panel assembly 2500 and the backlight unit 2400.

Figure 12:
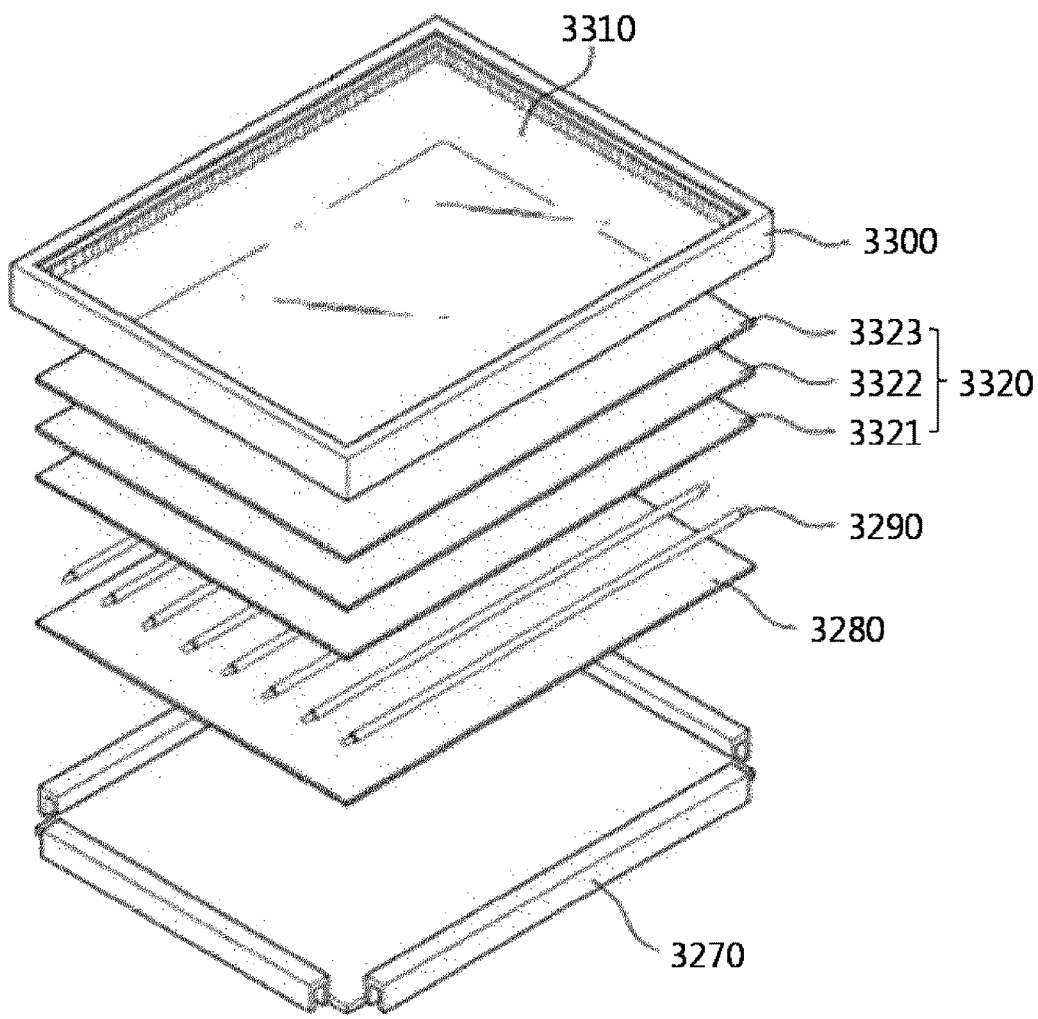
FIG. 12 is a perspective view of an LCD to which a reflective polarizer according to one embodiment of the present invention is applied.

Meanwhile, specifically, FIG. 12 illustrates an example of an LCD to which a reflective polarizer according to one embodiment of the present invention is applied, and a reflector 3280 is inserted into a frame 3270 and a CCFL 3290 is located on an upper surface of the reflector 3280. An optical film 3320 may be located on an upper surface of the CCFL 3290 and may include a diffusion plate 3321, a reflective polarizer 3322, and an absorbing polarizing film 3323, which are sequentially stacked. However, the components included in the optical film and a stacking order of the components may vary according to the purpose, and some components may be omitted or a plurality of components may be provided. Furthermore, a phase difference film (not illustrated) and the like may be inserted at an appropriate position in the LCD. Meanwhile, an LCD panel 3310 may be located on an upper surface of the optical film 3320 by being inserted into a mold frame 3300.

Referring to a path of light, light applied from the CCFL 3290 reaches the diffusion plate 3321 of the optical film 3320. The light transmitted through the diffusion plate 3321 is modulated while the light passes through the reflective polarizer 3322 in order for the light to proceed in a direction perpendicular to the optical film 3320. Specifically, a P wave is transmitted through the reflective polarizer without loss, an S wave is reflected by the reflector 3280, which is a back surface of the CCFL 3290, by light modulation (reflection, scattering, refraction, etc.), a property of the light is randomly changed into a P wave or S wave, and the light then passes through the reflective polarizer 3322 again. After the light passes through the absorbing polarizing film 3323, the light reaches the LCD panel 3310. Meanwhile, the CCFL 3290 may be replaced by an LED.

As the reflective polarizer according to one embodiment of the present invention is applied to the above-described embodiments, a plurality of light modulation characteristics may be effectively obtained, the brightness may be improved, light leakage and a bright line may not occur, an exterior defect in which a foreign matter appears on the exterior may be prevented, and at the same time, and reliability of the reflective polarizer may be ensured even in a high temperature and high humidity environment in which an LCD is used. Further, as a micro pattern layer and a light-collecting layer having functions are integrated with the reflective polarizer, a thickness of the light source assembly may be reduced, the assembling process may be simplified, and image quality of the LCD including the light source assembly may be improved.

Meanwhile, in the present invention, the use of the reflective polarizer has been described with reference to the LCD, but the present invention is not limited thereto, and the reflective polarizer may be widely used in technique of flat panel displays such as projection displays, PDPs, FEDs, ELDs, and the like.

EXAMPLES

The present invention will be described in more detail with reference the following examples. However, the following examples should not be construed as limiting the scope of the present invention, but should be construed to facilitate understanding of the present invention.

Example 1

PEN having a refractive index of 1.65 as a component of a dispersed body and a raw material containing 38 wt % of polycyclohexylene dimethylene terephthalate (PCTG), in which terephthalate, ethyl glycol, and cyclohexane dimethanol were polymerized at a molar ratio of 1:2 in 60 wt % of polycarbonate, and 2 wt % of heat stabilizer containing phosphate as a component of the base material were introduced into a first extruded portion and a second extruded portion, respectively. A raw material containing 38 wt % of PCTG, in which terephthalate, ethyl glycol, and cyclohexane dimethanol were polymerized at a molar ratio of 1:2 in 60 wt % of polycarbonate, and 2 wt % of a heat stabilizer containing phosphate as a component of a skin layer was introduced into a third extruded portion.

An extrusion temperature of the component of the base material was set to 280° C., and an extrusion temperature of the component of the dispersed body was set to 245° C., and Cap. Rheometer was used to correct a polymer flow through I.V. adjustment. The dispersed bodies inside the base material were induced to be dispersed through a flow path to which a filtration mixer is applied, and then the component of the skin layer were joined to both surfaces of the component of the base material. Spreading of the polymer was induced in the coat hanger die of FIGS. 9 and 10, in which a flow rate and a pressure gradient are corrected. Specifically, a width of an inlet of the die was 200 mm, a thickness of the inlet of the die was 10 mm, a width of an outlet of the die was 1,260 mm, a thickness of the outlet of the die was 2.5 mm, and the flow rate was 1.0 m/min. Then, a smoothing process was performed on a cooling and casting roll, and the dispersed bodies were elongated 6 times in an MD direction. Next, the randomly dispersed reflective polarizer having the cross-sectional structure as illustrated in FIG. 7 having a thickness of 120 μm (thickness of 300 μm including a skin layer) was manufactured by performing thermal fixing by a heat chamber at 180° C. for 2 minutes. Refractive indexes (nx, ny, and nz) of the PEN component of the manufactured reflective polarizer were 1.88, 1.58, and 1.58, respectively, a refractive index of the raw material containing 38 wt % of PCTG, in which terephthalate, ethyl glycol, and cyclohexane dimethanol were polymerized at a molar ratio of 1:2 in 60 wt % of polycarbonate, and 2 wt % of a heat stabilizer containing phosphate was 1.58, and the plurality of dispersed bodies were satisfied conditions as shown in Table 1 below.

TABLE 1

| Aspect Ratio[1] | First Group[2] (%) | Second Group[2] (%) | Third Group[2] (%) | 1/3 Group[3] |
|---|---|---|---|---|
| 95 | 49 | 39 | 12 | 4.1 |

[1]Aspect ratio: the number of dispersed bodies having an aspect ratio of 1/2 or less among the total number of dispersed bodies, which is expressed as %
[2]First group, second group, and third group: the number of dispersed bodies in which the present invention belongs to a cross-sectional area range of a first group, a second group, and a third group among dispersed bodies having an aspect ratio of 1/2 or less, which is expressed as %
[3]1/3 group: the number of dispersed bodies in the first group divided by the number of dispersed bodies in the third group.

Comparative Example 1

Figure 13:
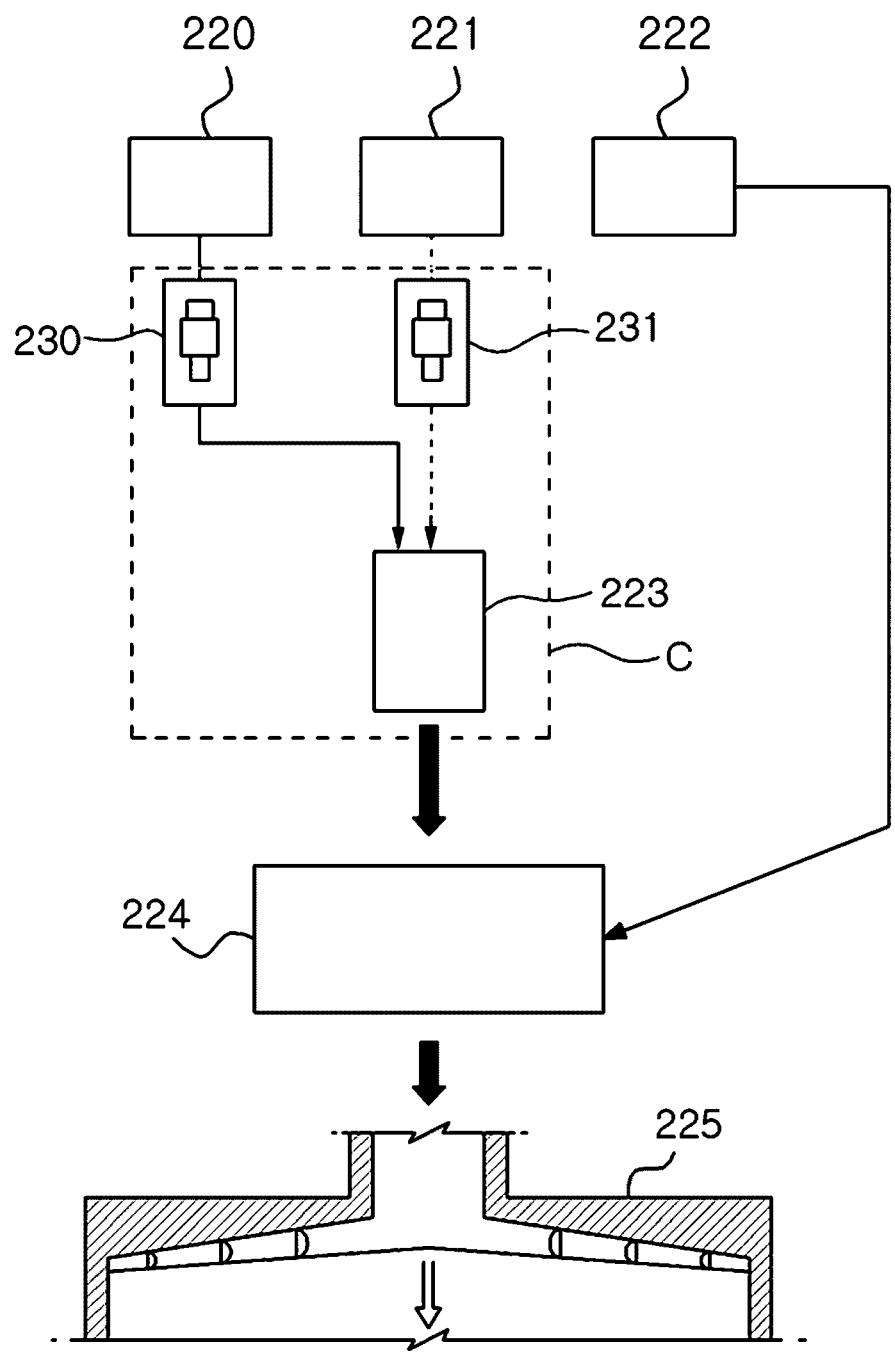
FIG. 13 is a schematic view of a process of manufacturing a plate-shaped polymer dispersed reflective polarizer according to a comparative example of the present invention.
Figure 14:
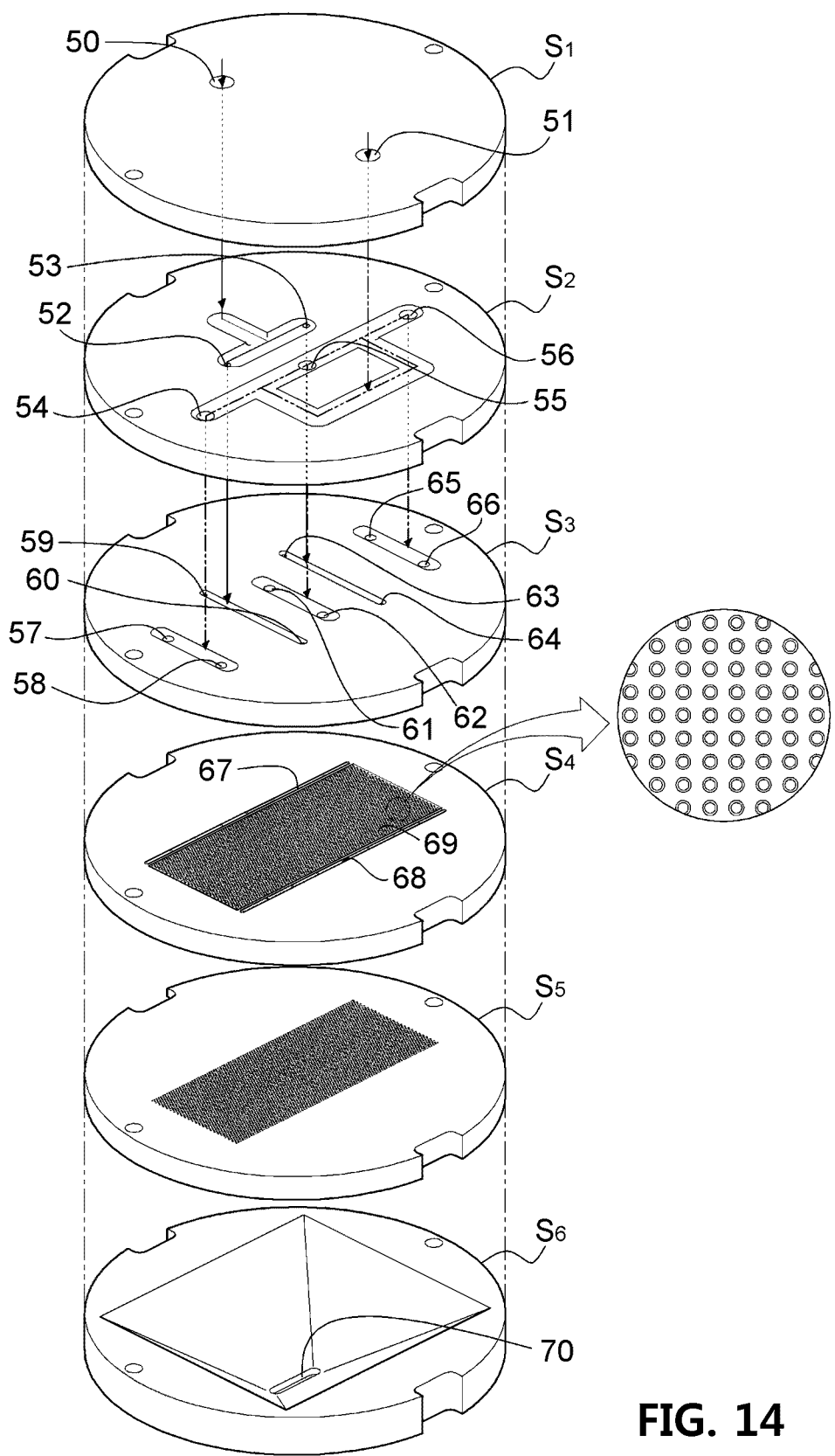
FIG. 14 is an exploded perspective view of a sea-island type extrusion opening according to a comparative example of the present invention.
Figure 15:
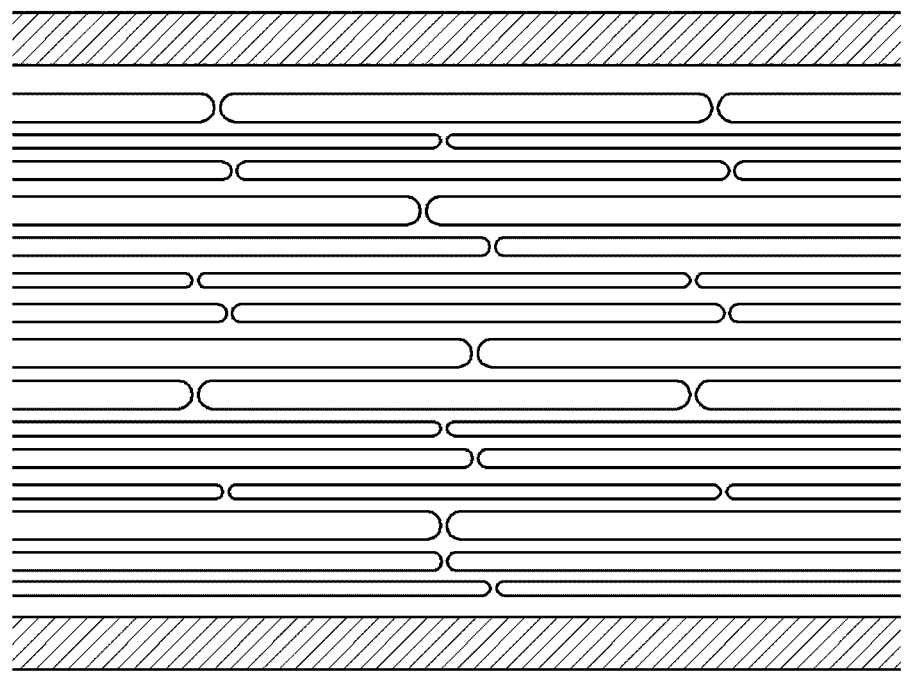
FIG. 15 is a cross-sectional view of a plate-shaped polymer dispersed reflective polarizer according to a comparative example of the present invention.

A process was performed on a flat-type polymer dispersed reflective polarizer as illustrated in FIG. 13. Specifically, PEN having a refractive index of 1.65 as a first component, co-PEN having a refractive index of 1.64, in which a mixture of dimethyl terephthalate and dimethyl-2,6-naphthalene dicarboxylate in a molar ratio of 6:4 was react with ethylene glycol (EG) in a molar ratio of 1:2, as a second component, and a polycarbonate alloy having a refractive index of 1.58, in which 90 wt % of polycarbonate and 10 wt % of PCTG were polymerized, as a component of a skin layer were introduced into a first extruded portion 220, a second extruded portion 221, and a third extruded portion 222, respectively. The extrusion temperature of the first component and the second component was set to 295° C., Cap. Rheometer was used to correct the polymer flow through I.V. adjustment, and the extrusion process was performed on the skin layer at a temperature level of 280° C. The first component was transferred to a first pressing unit 230 (a gear pump of Kawasaki Corp.) and the second component was transferred to a second pressing unit 231 (a gear pump of Kawasaki Corp.). A discharge amount of the first pressing unit was 8.9 kg/h, and a discharge amount of the second pressing unit was 8.9 kg/h. A sea-island type composite flow was manufactured using a sea-island extrusion opening as illustrated in FIG. 14. Specifically, the number of layer of a fourth opening dispersion plate $T_4$ of the sea-island type extrusion opening was 400, and a diameter of an opening hole of a component supply path was 0.17 mm, and the number of the component supply paths was 25,000. A diameter of an outlet of sixth opening dispersion plate was 15 mm×15 mm. In a three-layered feed block, the component of the skin layer flowed from the third extruded portion through the flow path to form the skin layers on upper and lower surfaces of the sea-island type composite flow (a polymer in the core layer). The spread of the polymer of the core layer on which the skin layer was formed was induced in the coat hanger die of FIGS. 9 and 10, in which the flow rate and the pressure gradient are corrected so that an aspect ratio of the sea-island type composite flow becomes 1/30295. Specifically a width of an inlet of the die was 200 mm, a thickness of the inlet of the die was 20 mm, a width of an outlet of the die was 960 mm, a thickness of the outlet of the die was 2.4 mm, and the flow rate was 1 m/min. Then, a smoothing process was performed on a cooling and casting roll, and the dispersed bodies were elongated 6 timed in an MD direction. As a result, a major axis length of a cross-section of the first component in a longitudinal direction was not changed but a minor axis length thereof was reduced. Then, thermal fixation was performed by an IR heater at 180° C. for 2 minutes to manufacture a reflective polarizing film in which polymers were dispersed as illustrated in FIG. 15. Refractive indexes (nx, ny, and nz) of the first component of the manufactured reflective polarizing film were 1.88, 1.64, and 1.64, respectively, and a refractive index of the second component was 1.64. An aspect ratio of the polymer was 1/180000, the number of layers was 400, the minor axis length (in a thickness direction) was 84 nm, the major axis length was 15.5 mm, and an average optical thickness was 138 nm. In this case, a thickness of the core layer of the manufactured reflective polarizer was 59 μm, and a sum of thickness of the upper and lower surfaces of the skin layer was 170.5 μm.

Comparative Example 2

PEN having a refractive index of 1.65 as a first component, co-PEN having a refractive index of 1.64, in which a mixture of dimethyl terephthalate and dimethyl-2,6-naphthalene dicarboxylate in a molar ratio of 6:4 was react with ethylene glycol (EG) in a molar ratio of 1:2, as a second component, and a polycarbonate alloy having a refractive index of 1.58, in which 90 wt % of polycarbonate and 10 wt % of PCTG were polymerized, as a component of a skin layer were introduced into a first extruded portion 220, a second extruded portion 221, and a third extruded portion 222, respectively. The extrusion temperature of the first component and the second component was set to 295° C., Cap. Rheometer was used to correct the polymer flow through I.V. adjustment, and the extrusion process was performed on the skin layer at a temperature level of 280° C.

Figure 16:
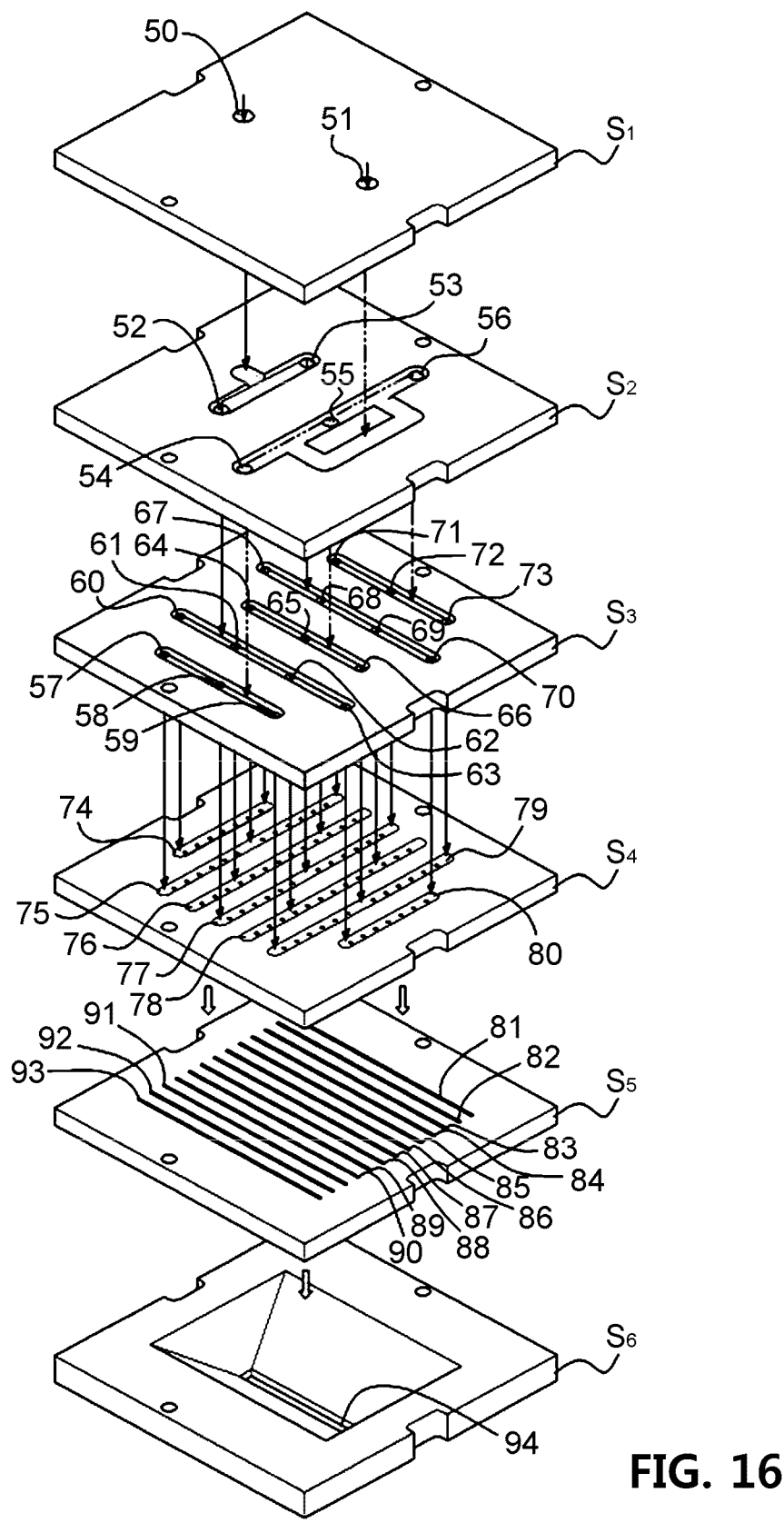
FIG. 16 is an exploded perspective view of a slit-type extrusion opening for manufacturing a multilayer reflective polarizer according to a comparative example of the present invention.
Figure 17:
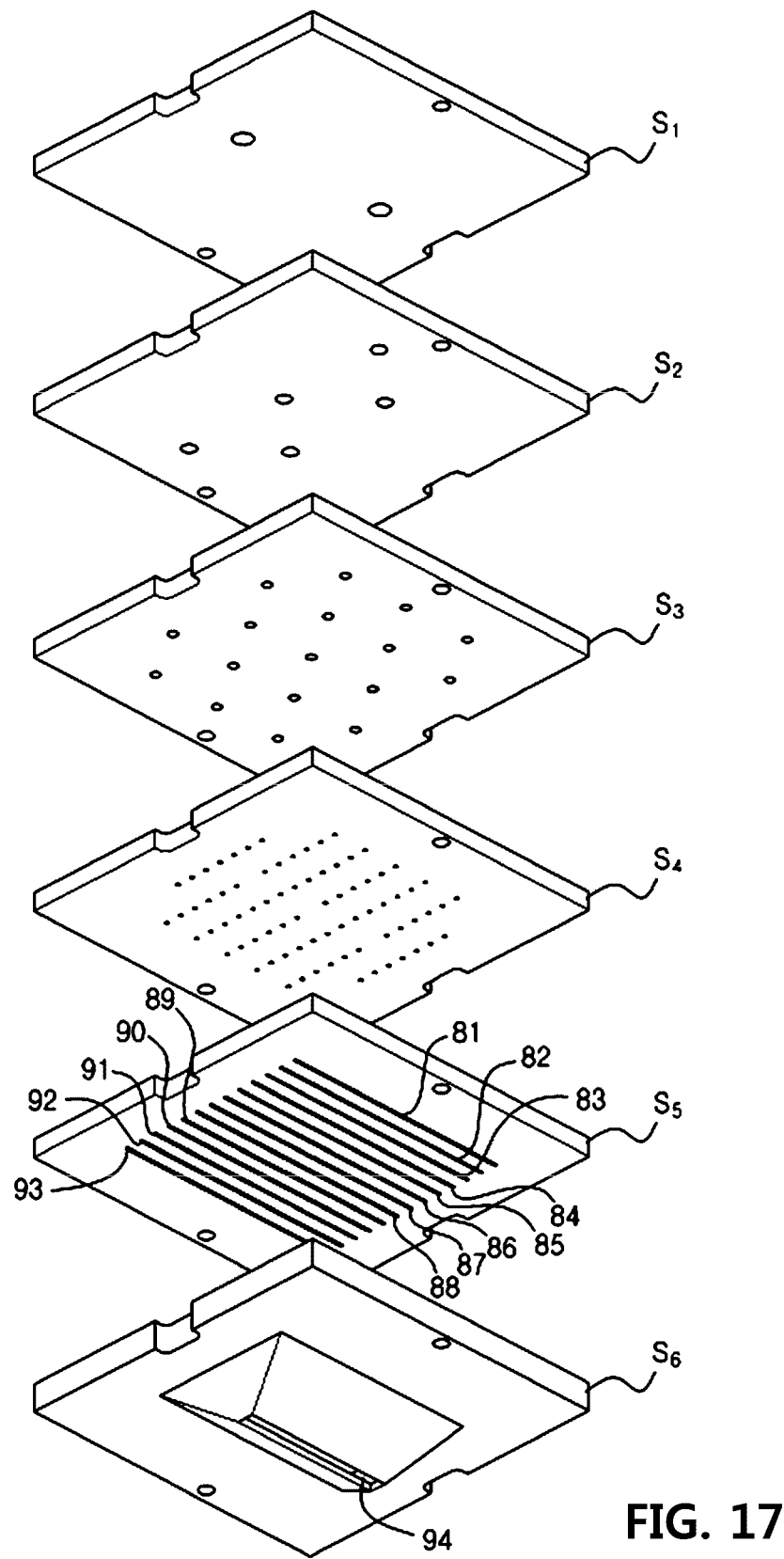
FIG. 17 is an exploded perspective view of a slit-type extrusion opening for manufacturing a multilayer reflective polarizer according to a comparative example of the present invention.
Figure 18:
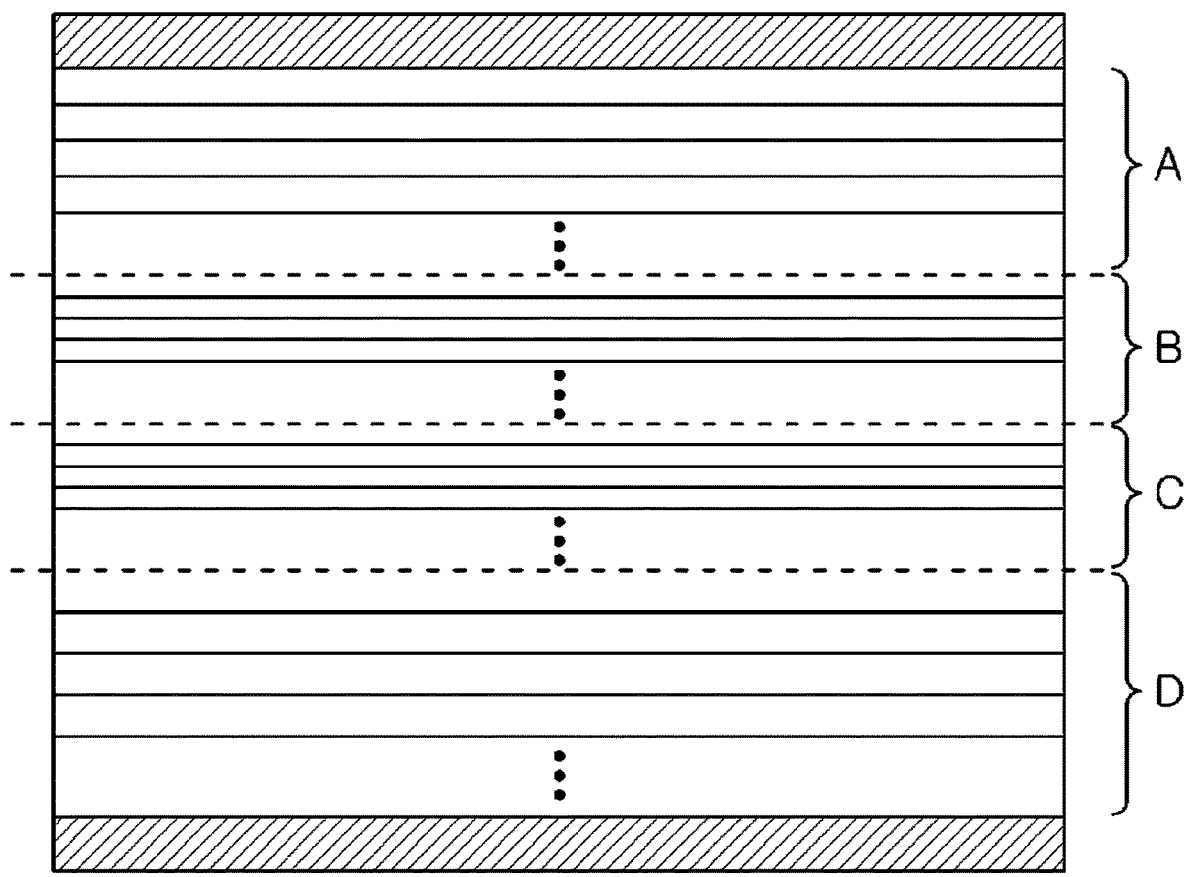
FIG. 18 is a cross-sectional view of a multilayer reflective polarizer according to a comparative example of the present invention.

Four composite flows having different average optical thicknesses were manufactured using four slit-type extrusion openings in FIGS. 16 and 17. Specifically, the first component transferred from the first extruded portion was distributed to the four slit-type extrusion openings, and the second component transferred from the second extruded portion was distributed to the four slit-type extrusion openings. One slit-type extrusion opening had 300 layers, a thickness of a slit of a first slit-type extrusion opening on a bottom surface of a fifth opening dispersion plate of FIG. 15 was 0.26 mm, a thickness of a slit of a second slit-type extrusion opening was 0.21 mm, a thickness of a slit of a third slit-type extrusion opening was 0.17 mm, a thickness of a slit of a fourth slit-type extrusion opening was 0.30 mm, and a diameter of an outlet of a sixth opening dispersion plate was 15 mm×15 mm. The four multilayer composite flows discharged through the four slit-type extrusion openings and the component of the skin layer transferred through a separate flow path were joined in a collection block to be joined to a single core layer and a skin layer integrally formed on both surfaces of the core layer. The spread of the polymer of the core layer on which the skin layer was formed was induced in the coat hanger die of FIGS. 9 and 10, in which the flow rate and the pressure gradient are corrected. Specifically, a width of an inlet of the die was 200 mm, a thickness of the inlet of the die was 20 mm, a width of an outlet of the die was 960 mm, a thickness of the outlet of the die was 2.4 mm, and the flow rate was 1 m/min. Then, a smoothing process was performed on a cooling and casting roll, and the dispersed bodies were elongated 6 timed in an MD direction. Then, thermal fixation was performed by an IR heater at 180° C. for 2 minutes to manufacture a reflective polarizing film in which polymers were dispersed as illustrated in FIG. 18. Refractive indexes (nx, ny, and nz) of the first component of the manufactured reflective polarizer were 1.88, 1.64, and 1.64, respectively, and a refractive index of the second component was 1.64. A group A had 300 layers (150 repeating units), a thickness of the repeating unit was 168 nm, an average optical thickness was 275.5 nm, and a deviation of the optical thickness was about 20%. A group B had 300 layers (150 repeating units), a thickness of the repeating unit was 138 nm, an average optical thickness was 226.3 nm, and a deviation of the optical thickness was about 20%. A group C had 300 layers (150 repeating units), a thickness of the repeating unit was 110 nm, an average optical thickness was 180.4 nm, and a deviation of the optical thickness was about 20%. A group D had 300 layers (150 repeating units), a thickness of the repeating unit was 200 nm, an average optical thickness was 328 nm, and a deviation of the optical thickness was about 20%. In the manufactured multiplayer reflective polarizer, the thickness of the core layer was set to 92.4 μm, the thickness of the skin layer was set to 153.8 μm, and the total thickness was set to 400 μm.

Experimental Example 1

The following physical properties were evaluated for the reflective polarizers manufactured through the above example and the comparative example, and results thereof are shown in Table 1.

1. Measurement of transmittance of first polarized light and second polarized light according to 45° non-normal line incidence and 90° normal line incidence In order to measure the transmittance, a polarimeter (Jasco V7100) was used. Specifically, a sample cell was mounted on an apparatus at 45° and 90° with respect to incident light, and then the transmittance and the polarization degree of the first polarized light and the second polarized light for each wavelength were measured.

Further, the transmittance of the first polarized light and the second polarized light at 45° incident angle for each wavelength in Example 1 are shown in FIG. 2.

2. Relative Brightness

The brightness of the manufactured reflective polarizer was measured as follows. Panels were assembled on a 32 inch direct backlight unit including a reflective film, a light guide plate, a diffusion plate, and a reflective polarizer, brightnesses were measured at nine points using a BM-7 measuring apparatus of Topcon Corporation, and then an average of the brightnesses was obtained.

A relative brightness refers to a relative value of the brightness of another example and comparative example when the brightness of the composite reflective polarizing film in Example 1 is 100 (reference).

3. Exterior Color

The exterior of the reflective polarizer was visually observed in the panel manufactured for relative brightness measurement. When the exterior does not show a specific color or iridescent light, the relative brightness is represented by 0, and when the exterior appears a specific color, the relative brightness is represented by 1 to 5 according to the degree thereof.

TABLE 2

|  |  |  | Example 1 | | Comparative Example 1 | | Comparative Example 2 | |
|---|---|---|---|---|---|---|---|---|
|  | Incident Angle (°) |  | 45 | 90 | 45 | 90 | 45 | 90 |
| First Polarized Light | Transmittance for Each Wavelength (%) | 450 nm | 76.20 | 76.42 | 58.34 | 62.55 | 70.89 | 74.19 |
|  |  | 480 nm | 79.91 | 80.33 | 75.81 | 76.17 | 62.05 | 69.84 |
|  |  | 580 nm | 85.52 | 85.83 | 78.08 | 86.09 | 64.69 | 72.76 |
|  |  | 680 nm | 87.83 | 88.07 | 80.65 | 86.54 | 88.49 | 92.51 |
|  |  | 780 nm | 89.40 | 89.01 | 86.78 | 87.87 | 98.54 | 99.54 |
|  | Minimum Transmittance[1] (%)/Wavelength (nm) |  | 76.20/450 | 76.42/450 | 58.34/450 | 62.55/450 | 42.22/630 | 54.55/600 |

TABLE 2-continued

|  |  |  | Example 1 | | Comparative Example 1 | | Comparative Example 2 | |
| --- | --- | --- | --- | --- | --- | --- | --- | --- |
|  | Maximum Transmittance[2] (%)/Wavelength (nm) | | 89.40/780 | 89.01/780 | 86.78/780 | 87.87/780 | 98.54/780 | 99.54/780 |
|  | Maximum Transmittance (%) − Minimum Transmittance[3] (%) | | 13.2 | 12.59 | 28.44 | 25.32 | 56.32 | 44.99 |
|  | Change Rate of Transmittance[4] (%/nm) | | 0.042 | 0.038 | 0.086 | 0.077 | 0.171 | 0.136 |
| Second Polarized Light | Transmittance for Each Wavelength (%) | 380 nm | 99.34 | 99.31 | 98.16 | 99.09 | 31.16 | 88.12 |
|  |  | 450 nm | 95.68 | 94.99 | 93.84 | 91.64 | 99.49 | 99.56 |
|  |  | 480 nm | 95.15 | 94.39 | 91.95 | 90.30 | 96.44 | 98.42 |
|  |  | 580 nm | 92.88 | 91.71 | 88.11 | 89.92 | 95.39 | 99.10 |
|  |  | 680 nm | 90.00 | 88.38 | 85.47 | 84.35 | 86.46 | 99.78 |
|  |  | 780 nm | 86.71 | 84.66 | 81.0 | 82.37 | 49.94 | 99.01 |
|  | Minimum Reflectivity (%)/Wavelength (nm) | | 99.34/380 | 99.31/380 | 98.16/380 | 99.09/380 | 99.83/440 | 99.78/680 |
|  | Maximum Reflectivity (%)/Wavelength (nm) | | 86.71/780 | 84.66/780 | 81.0/780 | 82.37/780 | 15.37/405 | 88.12/380 |
|  | Change Rate of Reflectivity[5] (%/nm) | | 0.026 | 0.031 | 0.052 | 0.028 | 0.15 | 0.035 |
| Physical Property | Relative Brightness | | 100 | 100 | 86 | 92 | 91 | 103 |
|  | Exterior Evaluation | | 0 | 0 | 2 (Orange) | 1 (Yellow) | 3 (Red) | 1 (Orange) |

[1]Minimum transmittance refers to a minimum transmittance in a wavelength range of 450 to 780 nm
[2]and [3]Minimum transmittance and maximum transmittance refer to a minimum value and a maximum value of transmittance in a wavelength range of 450 to 780 nm
[4]Change rate of Transmittance is $(T_2 - T_1)/(\lambda_2 - \lambda_1)$, here, $\lambda_1$ denotes a wavelength of 450 nm, $T_1$ denotes transmittance of first polarized light at a wavelength of 450 nm, $\lambda_2$ denotes a wavelength of 780 nm, and $T_2$ denotes transmittance of first polarized light at the wavelength of 780 nm
[5]Change rate of reflectivity is $|(R_2 - R_1)/((\lambda_2 - \lambda_1)|$, here, $\lambda_1$ denotes a wavelength of 450 nm, $R_1$ denotes reflectivity of second polarized light at a wavelength of 450 nm, $\lambda_2$ denotes a wavelength of 780 nm, and $R_2$ denotes reflectivity of second polarized light at the wavelength of 780 nm Specifically, as can be seen from the above Table 2, in the multilayer reflective polarizer in which optically isotropic components and anisotropic components were alternately stacked as in Comparative Example 2, it can be confirmed that the maximum transmittance of the first polarized light in the wavelength range of 380 to 780 nm according to the incident light in 45° non-normal line was 98%, but a difference between the maximum transmittance and the minimum transmittance was significant, and the maximum reflectivity of the second polarized light was 99.88%, but a change rate of the reflectivity of the second polarized light reached 0.15%/nm, which is very significant. Specifically, it can be confirmed that the maximum reflectivity reached 440 nm was 99.88% but the minimum reflectivity was only 15.37% at a wavelength of 405 nm, so that a difference between the maximum reflectivity the minimum reflectivity was significant, the control of the reflection axis related to the second polarized light was bad and red even in the exterior evaluation of the color modulation as the reflectivity variation is actually very large, and the brightness was also lower than that in Example 1. Further, it can be confirmed that the tendency of the transmittance or the reflectivity with respect to the normal line incident light (90°) and the non-normal line incident light (45°) were significantly different.

On the contrary, in Example 1, it can be confirmed that the transmittance of the brightness was also 76% or more in a region of 450 nm to 780 nm which was a visible light region, and the reflectivity of the second polarized light was also very high, which was superior to the comparative example. Further, in Example 1, it can be confirmed that there was almost no difference in transmittance between the normal line incident light (90°) and the non-normal line incident light (45°), ere was almost no difference in reflectivity therebetween, the uniform transmittance and reflectivity may be exhibited, and thus the color may be stably controlled.

Further, in Comparative Example 1, it can be confirmed that a difference between the maximum transmittance and the minimum transmittance of the first polarized light in the wavelength range of 380 to 780 nm according to the incident light in 45° non-normal line was smaller than that in Comparative Example 2 but was significantly greater than that in Example 1, the control of the reflection axis is bad and an exterior appears orange, the difference between the maximum reflectivity and the minimum reflectivity of the second polarized light was also significantly smaller than that in Example 1, and thus the brightness thereof was also significantly reduced than that in Example 1. Further, it can be confirmed that the tendency of the transmittance or the reflectivity with respect to the normal line incident light (90°) and the non-normal line incident light (45°) were significantly different.

The invention claimed is:
1. A reflective polarizer configured to transmit first polarized light parallel to a transmission axis and reflect second polarized light parallel to an extinction axis,
wherein:
the reflective polarizer is a polymer-dispersed reflective polarizer comprising a base material and a plurality of dispersed bodies randomly dispersed in the base material, wherein at least two of the plurality of dispersed bodies have different cross-section areas;
reflectivity of the second polarized light in a wavelength range of 380 to 780 nm according to a light ray having an incident angle of 45° is 85% or more;
a reflectivity change ratio of the second polarized light in a wavelength range of 450 to 780 nm according to a light ray having an incident angle of 45° according to Equation 1 below is 0.03%/nm or less, the first polarized light according to the light ray having an incident angle of 45° has a visible light transmission uniformity of 8% or less in a wavelength range of 480 to 580 nm, and a visible light transmission uniformity of 5% or less in a wavelength range of 580 to 780 nm;

the second polarized light according to the light ray having an incident angle of 45° has a visible light reflection uniformity of 5% or less in a wavelength range of 480 to 580 nm and a visible light reflection uniformity of 6% or less in a wavelength range of 580 to 780 nm; and a difference between first transmission (%) of the first polarized light according to a light ray having an incident angle of 90° at a wavelength of 580 nm and second transmission (%) of the first polarized light according to the light ray having an incident angle of 45° at a wavelength of 580 nm is 8% or less, $$\text{reflectivity change ratio} = \left| \frac{R_2(\%) - R_1(\%)}{\lambda_2(nm) - \lambda_1(nm)} \right| \quad \text{[Equation 1]}$$

here, $\lambda_1$ is 450 nm, $R_1$ denotes reflectivity of the second polarized light at $\lambda_1$, $\lambda_2$ is 780 nm, and $R_2$ denotes reflectivity of the second polarized light at $\lambda_2$.

2. The reflective polarizer of claim 1, wherein the second polarized light according to the light ray having an incident angle of 45° has reflectively of 94 to 96% at a wavelength of 480 nm, reflectively of 92 to 94% at a wavelength of 580 nm, reflectivity of 88 to 91% at a wavelength of 680 nm, and reflectivity of 85 to 88% at a wavelength of 780 nm.

3. The reflective polarizer of claim 1, wherein the first polarized light according to the light ray having an incident angle of 45° has transmittance of 72% or more in a wavelength range of 450 to 780 nm.

4. The reflective polarizer of claim 3, wherein reflectivity of the second polarized light according to the light ray having an incident angle of 45° at the same wavelength range of 450 to 780 nm as the first polarized light having a lowest transmittance among transmittances of the first polarized light according to the wavelength range according to the light ray having an incident angle of 45° at the wavelength range of 450 to 780 nm is 95% or more.

5. The reflective polarizer of claim 1, wherein a difference between third transmittance (%) of the first polarized light according to a light ray having an incident angle of 90° at a wavelength of 450 nm and fourth transmittance (%) of the first polarized light according to the light ray having an incident angle of 45° at a wavelength of 450 nm is 5% or less.

6. The reflective polarizer of claim 1, wherein a difference between fifth transmittance (%) of the first polarized light according to a light ray having an incident angle of 90° at a wavelength of 780 nm and sixth transmittance (%) of the first polarized light according to the light ray having an incident angle of 45° at a wavelength of 780 nm is 5% or less.

7. A backlight unit including the reflective polarizer according to claim 1.

8. A liquid-crystal display including the backlight unit according to claim 7.

9. The reflective polarizer of claim 1, wherein a difference between maximum transmission of and minimum transmission of the first polarized light according to a light ray having an incident angle of 450 in a wavelength range of 450 to 780 nm is 20% or less.

\* \* \* \* \*